United States Patent
Ettes et al.

(10) Patent No.: US 11,128,172 B2
(45) Date of Patent: Sep. 21, 2021

(54) POWER TRANSMITTER AND METHOD FOR WIRELESSLY TRANSFERRING POWER

(71) Applicant: KONINKLIJKE PHILIPS N.V., Eindhoven (NL)

(72) Inventors: Wilhelmus Gerardus Maria Ettes, Leeuwarden (NL); Antonius Adriaan Maria Staring, Eindhoven (NL); Lennaert Quirijn Bronts, Tricht (NL); Eddy Gerrit Veltman, Steenbergen (NL); Andries Van Wageningen, Wijlre (NL)

(73) Assignee: Koninklijke Philips N.V., Eindhoven (NL)

( * ) Notice: Subject to any disclaimer, the term of this patent is extended or adjusted under 35 U.S.C. 154(b) by 220 days.

(21) Appl. No.: 16/346,160

(22) PCT Filed: Nov. 6, 2017

(86) PCT No.: PCT/EP2017/078265
§ 371 (c)(1),
(2) Date: Apr. 30, 2019

(87) PCT Pub. No.: WO2018/083283
PCT Pub. Date: May 11, 2018

(65) Prior Publication Data
US 2020/0052527 A1  Feb. 13, 2020

(30) Foreign Application Priority Data
Nov. 7, 2016 (EP) ..................... 16197517

(51) Int. Cl.
*H02J 50/12* (2016.01)
*H02J 50/80* (2016.01)

(52) U.S. Cl.
CPC .............. *H02J 50/12* (2016.02); *H02J 50/80* (2016.02)

(58) Field of Classification Search
CPC .. H02J 50/12; H02J 50/80; H02J 5/005; H02J 7/025
(Continued)

(56) References Cited

U.S. PATENT DOCUMENTS

| | | | |
|---|---|---|---|
| 2012/0050015 A1* | 3/2012 | Low | H02J 7/00034 340/10.1 |
| 2012/0153739 A1* | 6/2012 | Cooper | H02J 50/12 307/104 |

(Continued)

OTHER PUBLICATIONS

Firdaus et al., "Design of wireless battery charger using near-field induction method", 2015, 9th International Conference on Telecommunication Systems Services and Applications, IEEE.
(Continued)

*Primary Examiner* — Alfonso Perez Borroto

(57) ABSTRACT

A power transmitter (501) for a wireless power transfer system includes a parallel resonance circuit (601) comprising at a transmitter coil (503) for generating the power transfer signal. A power source (605) has a current sink terminal and a power source terminal providing current to the parallel resonance circuit (601) with a limited rate of change of the current drawn. A first switch element (607) is coupled between a first end of the parallel resonance circuit (601) and the current sink terminal. A second switch element (609) is coupled between the other end and the current sink terminal. A driver (611) generates a cyclic drive signal such that each cycle comprises a two time intervals in which one switch element (607, 609) is closed and the other (607, 609) is open; and a third time interval in which both the first switch element (607) and the second switch element (609) are closed, the third time interval being between the other two intervals.

19 Claims, 16 Drawing Sheets

(58) Field of Classification Search
USPC .......................................................... 307/104
See application file for complete search history.

(56) References Cited

U.S. PATENT DOCUMENTS

| | | | |
|---|---|---|---|
| 2012/0235508 A1* | 9/2012 | Ichikawa ............. | H04B 5/0093 307/104 |
| 2012/0242283 A1* | 9/2012 | Kim ........................ | H02J 7/025 320/108 |
| 2013/0033118 A1 | 2/2013 | Karalis et al. | |
| 2015/0295417 A1* | 10/2015 | Park ........................ | H02J 50/12 307/104 |

OTHER PUBLICATIONS

International Search Report and Written Opinion, International Application No. PCT/EP2017/078265, dated Dec. 1, 2017.
Alberkrack, J., "A Simplified Power Supply Design Using the TL494 Control Circuit—Doc. AN983/D", Jan. 2002, pp. 1-8.
Texas Instruments Inc., "TL494 Pulse-Width-Modulation Control Circuits 1 Features Complete PWM Power-Control Circuitry @BULLET Uncommitted Outputs for 200-mA Sink or Source Current @BULLET Output Control Selects Single-Ended or Push-Pull Operation @BULLET Internal Circuitry Prohibits Double Pulse at Either Output @BULLET", Jan. 1983.
Wireless Power Consortium, https://www.wirelesspowerconsortium.com/, Accessed Apr. 2019.

* cited by examiner

POWER TRANSMITTER AND METHOD FOR WIRELESSLY TRANSFERRING POWER

CROSS-REFERENCE TO PRIOR APPLICATIONS

This application is the U.S. National Phase application under 35 U.S.C. § 371 of International Application No. PCT/EP2017/078265, filed on 6 Nov. 2017, which claims the benefit of European Patent Application No. 16197517.2, filed on 7 Nov. 2016. These applications are hereby incorporated by reference herein.

FIELD OF THE INVENTION

The invention relates to inductive power transfer and in particular, but not exclusively, to a power transmitter providing inductive power transfer using elements compatible with the Qi Specifications for wireless power transfer systems.

BACKGROUND OF THE INVENTION

Most present day systems require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers having a tight coupling between a primary transmitter coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach known as the Qi Specifications has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

Typically the transmitter coil of a power transmitter is driven by an output circuit in the form of an inverter which converts a typically DC power source to an AC signal suitable for generating the inductive wireless power transfer signal. The inverter circuit is typically based on the half or the full bridge topology, examples of which are shown in FIGS. 1-4. Further information may e.g. be found in the Qi specification V.1.2.

In FIGS. 1-4, the power receiver is represented by a simplified circuit comprising a series resonance circuit $L_3, C_3$ in series with a switch $S_1$ coupling the series resonance circuit to a load $R_1$.

In the examples, FIG. 1 illustrates a transmitter based on series resonant half bridge inverter, FIG. 2 illustrates a transmitter based on series resonant full bridge inverter, FIG. 3 illustrates a transmitter based on parallel resonant half bridge inverter, and FIG. 4 illustrates a transmitter based on parallel resonant full bridge inverter.

An advantage of the half bridge and the full bridge topology is that it has low complexity yet provides the ability to control the power level both by adjustment of the duty cycle and of the drive frequency. Furthermore, the voltage rating of the used Field Effect Transistors (FETs) can be limited to the maximum supply voltage Udc (with a suitable margin).

For lower coupling between the transmitter coil and the receiver coil, the coil current in the transmitter coil must be increased to achieve the same power transfer from transmitter to receiver. This can be achieved with a higher rail voltage or by moving the drive/operating frequency (Fop) towards the resonance frequency (Fres) of the tank. When the coupling between transmitter and receiver coil is low and the transmitter has a limited rail voltage, the transmitter must operate with a drive frequency very near the resonance frequency. Indeed, the maximum current is achieved when the frequencies are identical, Fop=Fres. However, operating with a drive frequency near the resonance frequency has a number of disadvantages, including:

It may degrade load modulation from the power receiver to the power transmitter. In systems, such as Qi, load modulation of the power transfer signal is used to communicate messages from the receiver to the transmitter. However, if the drive frequency is near the resonance frequency, a frequency beat equal to the difference occurs which will often interfere with the demodulation. This is especially problematic if the difference in frequency is close to the symbol rate of the communication. Indeed, in such a scenario, the beat signal cannot be removed by filtering of the load modulated signal.

The resonance frequency may change due to the proximity of the receiver to the transmitter; e.g. if the receiver coil is moved towards the transmitter coil, the inductance value of the transmitter coil increases and therefore the resonance frequency will be lower. When the drive frequency is near the resonance frequency this can result in a substantial change in the transmitter coil current. The transmitter then needs to adapt the drive frequency and/or the supply voltage and/or the duty cycle to compensate for this effect. However, as the change in current may be large, a drastic change may be required and this may be difficult to accurately achieve.

It may degrade or complicate communication from the power transmitter to the power receiver. Specifically, if the power transmitter uses frequency modulation of the power transfer signal to communicate to the power receiver, this may result in significant power level changes when the drive frequency and the resonance frequency are close to each other. Thus, a large frequency to amplitude modulation conversion may be experienced.

The above described topologies have some other intrinsic disadvantages as well, including:

The voltage on the bridge nodes (U_leg, U_left_leg, U_leg_right), as well as the voltage U_L1 over the transmitter coil exhibit a relatively high rate of change, dV/dt, effecting the EMI (ElectroMagnetic Interference) performance of the complete wireless power system. Overvoltage conditions may occur at the power receiver. E.g. in FIGS. 1-4, if the load of the power receiver, represented by R1, is disconnected from the resonant power receiver network L3-C3 by switch S1 (during start-up for instance), an overvoltage might occur at the terminals of S1. When disconnecting the load from the inverter, the damping of the resonant power transmitter network L1 & C1 is reduced, resulting in an increase of the voltage across L1 (U_L1). Further, because of the coupling between L1 and L3, this may lead to an overvoltage condition at the receiver side. Indeed, typically it takes a few milliseconds for a control loop to reduce this voltage level back to the nominal value. In the meantime, the electronic switch S1, and even the electronic circuitry behind the switch, might be damaged by the overvoltage.

Thus, current approaches for driving the transmitter coil of a power transmitter tends to be suboptimal and have associated disadvantages.

Hence, an improved approach would be advantageous. In particular, an approach that allows improved operation, improved power transfer, increased flexibility, facilitated implementation, facilitated operation, improved communication, reduced communication errors, reduced risk of overvoltage, improved operating conditions, reduced EMI, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for a wireless power transfer system including a power receiver for receiving a power transfer from the power transmitter via a wireless inductive power transfer signal; the power transmitter comprising: a parallel resonance circuit comprising at least a capacitive impedance and an inductive impedance, the inductive impedance comprising a transmitter coil for generating the power transfer signal; a power source having a current sink terminal and at least one power source terminal for providing current to the parallel resonance circuit, the power source being arranged to limit a rate of change of a current drawn from the power source terminal; a first switch element having a first terminal coupled to a first end of the parallel resonance circuit and a second terminal coupled to the current sink terminal; a second switch element having a first terminal coupled to a second end of the parallel resonance circuit and a second terminal coupled to the current sink terminal; a driver for generating at least one cyclic drive signal for the first switch element and the second switch element; the driver being arranged to generate the at least one cyclic drive signal such that each cycle comprises a first time interval in which the first switch element is closed and the second switch element is open, a second time interval in which the first switch element is open and the second switch element is closed; and a third time interval in which both the first switch element and the second switch element are closed, the third time interval being between the first time interval and the second time interval.

The invention may provide improved performance in a wireless power transfer system. In many embodiments, it may mitigate disadvantages known from conventional power transmitter output circuits, such as full bridge or half bridge inverters.

The approach may provide a system with reduced peak voltages in the driving circuit. It may further in many scenarios provide reduced voltage rate changes thereby proving improved EMI performance.

The approach may provide improved adaptation to variations in operating conditions. It may provide an improved and/or facilitated approach for controlling the effective resonance frequency of the output circuit, and in particular may provide of improved alignment of the effective resonance frequency to the cyclic drive signal. In many embodiments, durations of time intervals in which both the first and second switch elements are closed may be adapted (often automatically) such that the effective resonance of the parallel resonance circuit matches that of the drive signal. Indeed, in many embodiments, the duration may automatically be such that the drive frequency and the effective resonance frequency will inherently be the same.

The approach may often provide a very efficient and very quick adaptation to changes in the operating conditions, and specifically to the conditions of the transmitter coil. For example, quick adaptation to changes in the loading by the power receiver or the coupling between the power receiver and power transmitter may be achieved. This may provide substantially improved performance and may in particular mitigate and/or reduce the risk of overvoltage conditions occurring at the power receiver.

The approach may in many embodiments and scenarios reduce e.g. frequency modulation to amplitude modulation conversion when communicating from the power transmitter to the power receiver using frequency modulation of the power transfer signal. It may also in many embodiments and scenarios improve and facilitate load modulation communication from the power receiver to the power transmitter.

Each switch element may be arranged to switch state (from open to closed and/or from closed to open) in response to a cyclic drive signal. In many embodiments, a plurality of drive signals may be used with one for each switch element. In such a case, the drive signals may be cyclical with the same frequency and specifically may be the same but with a time offset. The cyclic drive signals may typically be periodic.

The rate of change may be limited by being given as a function of a voltage of the power source terminal. Specifically, the rate of change of the current may be a monotonically decreasing function of the voltage.

The resistance of a switch element is higher when open than closed. An open state for a switch element may be a non-conducting state and a closed state may be a conducting state.

In many embodiments, the duration of the third time interval may exceed 0.5%, 1%, 2%, 3%, 5% or 10% of the duty cycle duration of the cyclic drive signal. In many embodiments, the duration of the third time interval may exceed 0.5%, 1%, 2%, 3%, 5% or 10% of a duration of at least one of the first time interval and the second time interval.

In accordance with an optional feature of the invention, the transmitter coil has a center tap and the at least one power source terminal is coupled to the center tap.

This may provide an advantageous implementation in many embodiments. In particular, it may reduce complexity and/or allow lower component cost while still providing at least most of the advantageous effects. In many embodiments, it may for example require only a single power provision (i.e. just a single terminal). The power provided to the parallel resonance circuit from the power source may be provided (only) to the center tap.

The power source may comprise a first inductor coupled to the power source terminal. The inductor may be coupled/connected between the power source terminal and a constant voltage source.

In accordance with an optional feature of the invention, the power source comprises a first power source terminal coupled to the first end of the parallel resonance circuit and a second power source terminal coupled to the second end of the parallel resonance circuit; and the power source is arranged to individually limit the current drawn from the first and second power source terminals.

This may provide an advantageous implementation in many embodiments. In particular, it may reduce complexity while still providing at least most of the advantageous effects. It may avoid the necessity of a center tap of the transmitter coil. The power provided to the parallel resonance circuit from the power source may be provided (only) to the two ends of the parallel resonance circuit.

In accordance with an optional feature of the invention, the power source comprises a first inductor coupled to the first power source terminal and a second inductor coupled to the second power source terminal.

This may provide an efficient and advantageous implementation with suitable current (rate of change) control.

The first inductor may be coupled/connected between the first power source terminal and a constant voltage source. The second inductor may be coupled/connected between the second power source terminal and a constant voltage source.

The power source may be arranged to provide current extracted from the first power source terminal through the first inductor (and only through this), and to provide current extracted from the second power source terminal through the second inductor (and only through this).

In accordance with an optional feature of the invention, a cycle duration for a cycle of the cyclic drive signals exceeds a resonance period time for a resonance frequency corresponding to the capacitive impedance and inductive impedance by no less than 5%.

This may provide advantageous operation and performance in many embodiments. The resonance frequency corresponding to the capacitive impedance and inductive impedance may be the frequency at which the parallel resonance circuit would oscillate if freely resonating. The resonance frequency may be given as:

$$f = \frac{1}{2\pi\sqrt{LC}}$$

where L is the inductance of the inductive impedance and C is the capacitance of the capacitive impedance.

In accordance with an optional feature of the invention, the power transmitter is arranged to vary a duration of the third time interval in response to a variation of a loading of the power transfer signal.

This may in many embodiments allow the circuit to quickly, and in most embodiments, immediately, adapt the operation of the circuit to compensate for variations in the operational scenario.

In accordance with an optional feature of the invention, the power transmitter is arranged to vary a duration of the third time interval in response to a variation of a coupling between the power transmitter and the power receiver.

This may in many embodiments allow the circuit to quickly, and in most embodiments, immediately, adapt the operation of the circuit to compensate for variations in the operational scenario.

In some embodiments, the power transmitter is arranged to vary a duration of the third time interval in response to a variation of a component value (e.g. tolerances or drift).

In accordance with an optional feature of the invention, the power transmitter is arranged to synchronize at least one of an end time and a start time of the third time interval to a property of a signal of the parallel resonance circuit.

This may provide advantageous operation in many embodiments. In particular, it may allow and/or facilitate a system automatically adapting to changes resulting in resonance frequency variations.

In accordance with an optional feature of the invention, the power transmitter is arranged to initiate the third time interval in response to a zero crossing of a voltage over the second switch element.

This may provide advantageous operation in many embodiments. In particular, it may allow and/or facilitate a system automatically adapting to changes resulting in resonance frequency variations. A zero crossing may be considered to correspond to a situation wherein the voltage from a positive value falls below a threshold or from a negative value increases above a threshold. The threshold may typically be in the interval from −1V to 1V)

In accordance with an optional feature of the invention, the power transmitter is arranged to terminate the third time interval by the at least one cyclic drive signal switching to a state corresponding to the first switch element being open.

This may provide advantageous operation in many embodiments. In particular, it may allow and/or facilitate a system automatically adapting to changes resulting in resonance frequency variations. In particular, a start time for the third time interval may be determined in response to a property of a signal of the parallel resonance circuit meeting a criterion, such as a zero crossing of a voltage, and an end time may be determined in response to the cyclic drive signal switching a switch element off. Thus, the start of the third time interval is given by the oscillation property of the parallel resonance circuit whereas the end of the third time interval is given by the timing of the drive signal. This may allow the effective resonance frequency of the parallel resonance circuit to be adapted to match the drive frequency.

In accordance with an optional feature of the invention, the second switch element comprises a rectifier entering a conducting state following the zero crossing.

This may provide a particularly efficient operation and may provide a low complexity approach to adapting the third time interval appropriately. The rectifier entering the conducting state may provide a conducting path between the terminals of the second switch element, thus entering the second switch element into a conducting state. The rectifier may thus close the switch element even if the drive signal corresponds to an open state for the switch element. The rectifier may be a diode.

In accordance with an optional feature of the invention, the second switch element comprises a Field Effect Transistor coupled between the first terminal and the second terminal of the second switch element and is arranged to switch in response to the at least one cyclic drive signal; and the rectifier is formed by a body diode of the Field Effect Transistor.

This may provide a very efficient and low complexity implementation. In accordance with an optional feature of the invention, a duty cycle of the drive signal is independent of a duration of the third time interval.

This may provide advantageous operation and/or implementation in many scenarios and embodiments. The duty cycle may typically be in excess of 50%. In accordance with an optional feature of the invention, the driver is arranged to vary a duty cycle of the drive signal in response to a duration of the third time interval. This may provide advantageous operation and/or implementation in many scenarios and embodiments. The duty cycle may typically be in excess of 50%.

According to an aspect of the invention there is provided a method of operation for a wireless power transfer system including a power receiver for receiving a power transfer from a power transmitter via a wireless inductive power transfer signal; the power transmitter including: a parallel resonance circuit comprising at least a capacitive impedance and an inductive impedance, the inductive impedance comprising a transmitter coil for generating the power transfer signal; a power source having a current sink terminal and at least one power source terminal for providing current to the parallel resonance circuit, the power source being arranged to limit a rate of change of a current drawn from the power source terminal; a first switch element having a first terminal coupled to a first end of the parallel resonance circuit and a second terminal coupled to the current sink terminal; a second switch element having a first terminal coupled to a second end of the parallel resonance circuit and a second terminal coupled to the current sink terminal; a driver for generating at least one cyclic drive signal for the first switch element and the second switch element; the method comprising: the driver generating the at least one cyclic drive signal such that each cycle comprises a first time interval in which the first switch element is closed and the second switch element is open, a second time interval in which the first switch element is open and the second switch element is closed; and a third time interval in which both the first switch element and the second switch element are closed, the third time interval being between the first time interval and the second time interval.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
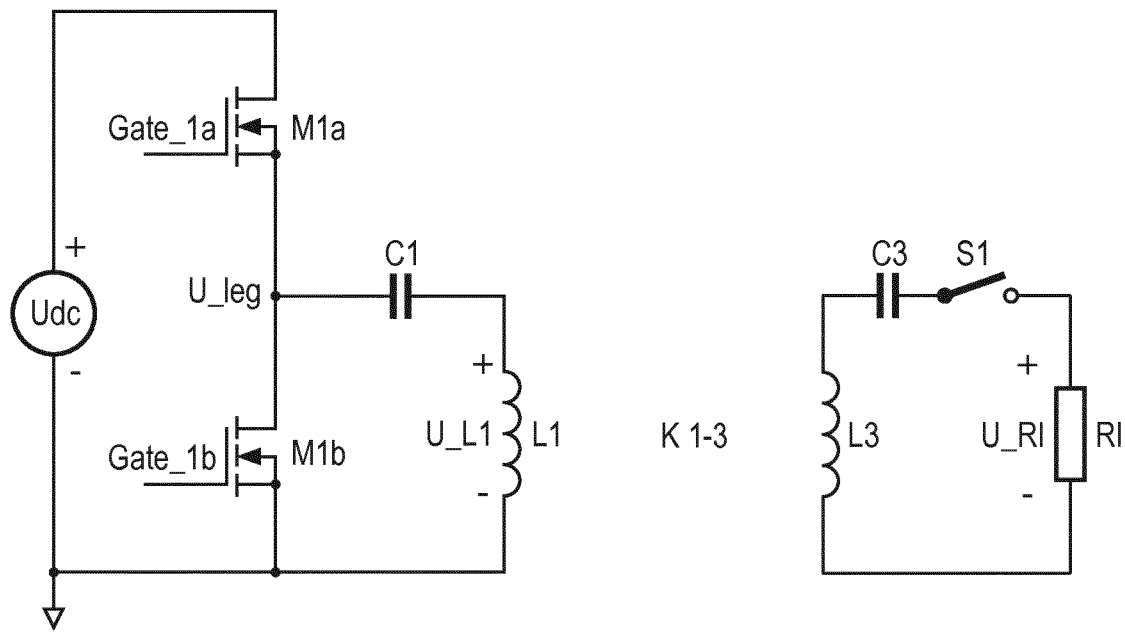
FIG. 1-4 illustrates examples of power transmitter arrangements using a half- or full bridge inverters in accordance with prior art.
Figure 2:
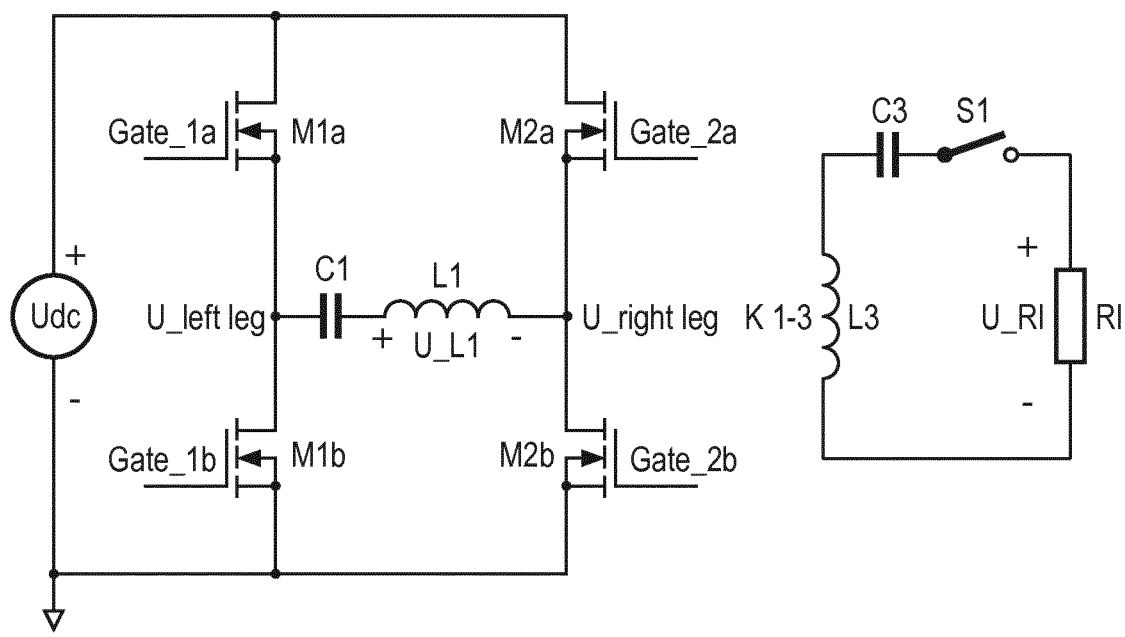
Figure 3:
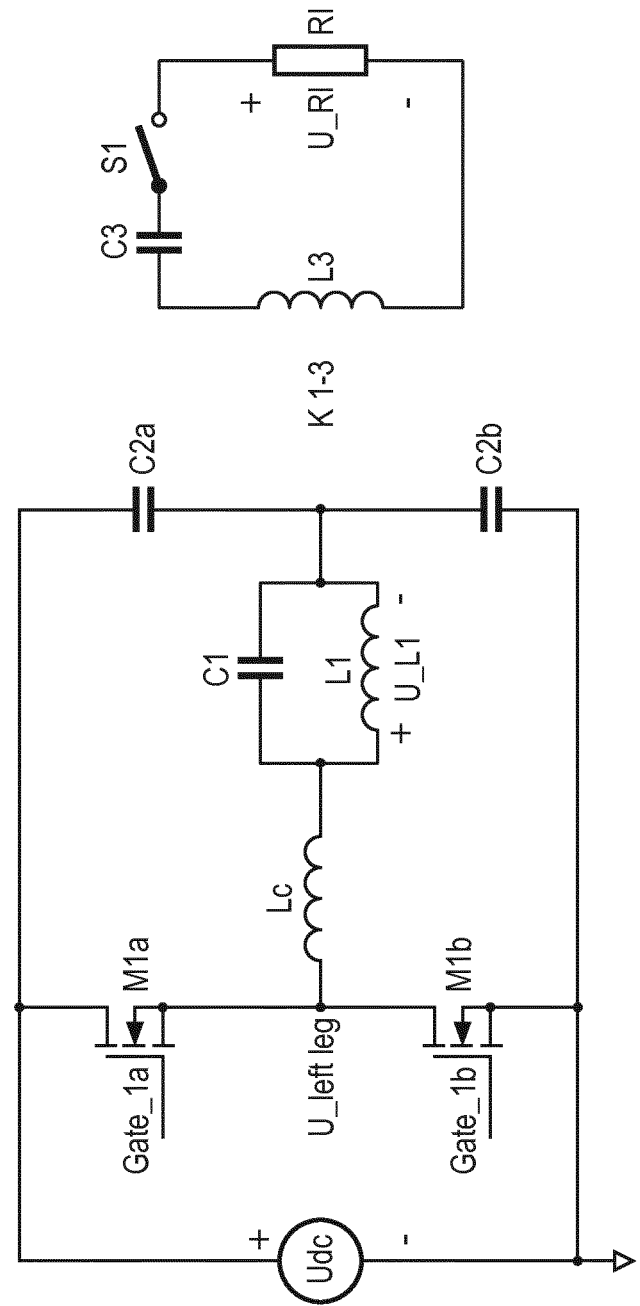
Figure 4:
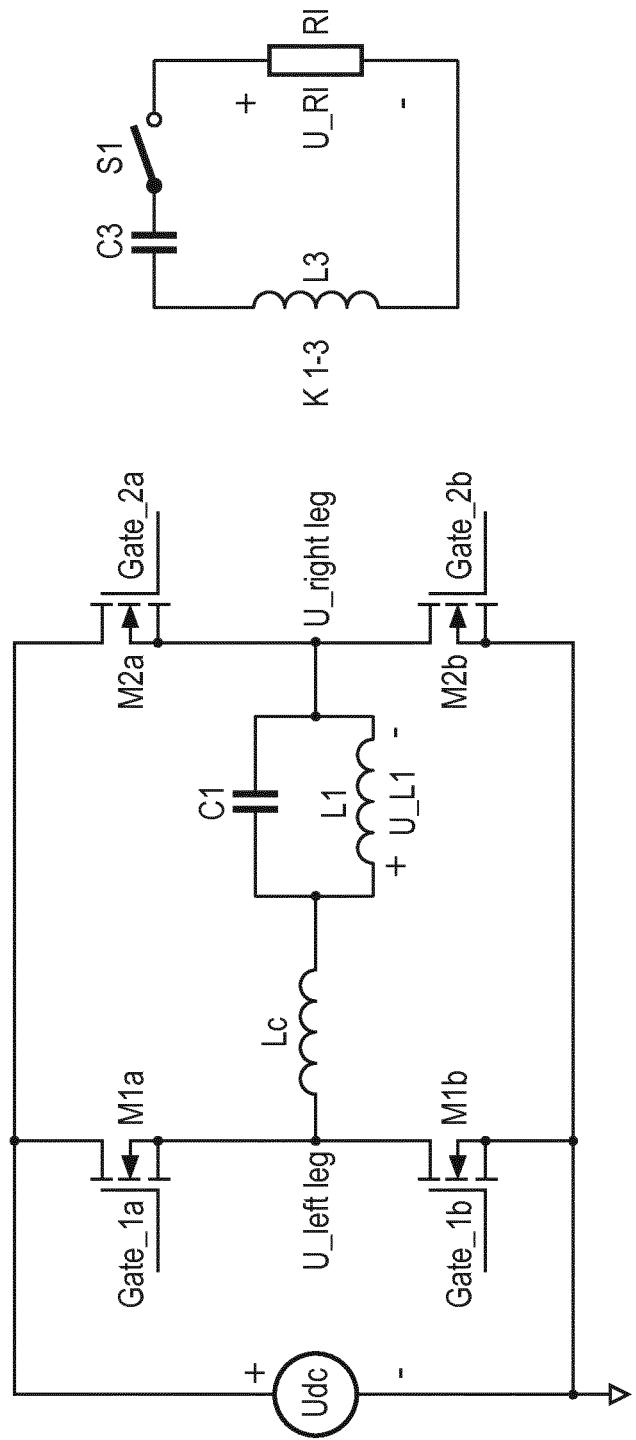
Figure 5:
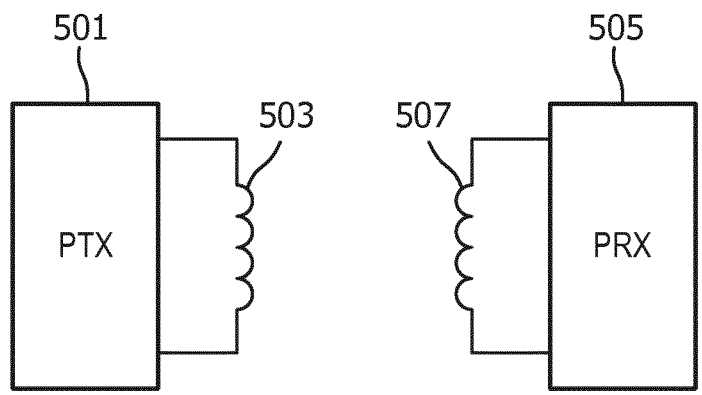
FIG. 5 illustrates an example of elements of a power transfer system in accordance with some embodiments of the invention.

FIG. 5 illustrates an example of a power transfer system in accordance with some embodiments of the invention. The power transfer system comprises a power transmitter 501 which includes (or is coupled to) a transmitter coil/inductor 503. The system further comprises a power receiving device 505 which includes (or is coupled to) a receiver coil/inductor 507.

The system provides a wireless inductive power transfer from the power transmitter 501 to the power receiving device 505. Specifically, the power transmitter 501 generates a wireless inductive power transfer signal (also referred to as a power transfer signal or an inductive power transfer signal), which is propagated as a magnetic flux by the transmitter coil or inductor 503. The power transfer signal may typically have a frequency between around 20 kHz to around 500 kHz, and often for Qi compatible systems typically in the range from 95 kHz to 205 kHz (or e.g. for high power kitchen applications, the frequency may e.g. typically be in the range between 20 kHz to 80 kHz). The transmitter coil 503 and the power receiving coil 507 are loosely coupled and thus the power receiving coil 507 picks up (at least part of) the power transfer signal from the power transmitter 501. Thus, the power is transferred from the power transmitter 501 to the power receiving device 505 via a wireless inductive coupling from the transmitter coil 503 to the power receiving coil 507. The term power transfer signal is mainly used to refer to the inductive signal/magnetic field between the transmitter coil 503 and the power receiving coil 507 (the magnetic flux signal), but it will be appreciated that by equivalence it may also be considered and used as a reference to an electrical signal provided to the transmitter coil 503 or picked up by the power receiving coil 507.

In the example, the power receiving device 505 is specifically a power receiver which receives power via a receive coil 507. However, in other embodiments, the power receiving device 505 may comprise a metallic element, such as a metallic heating element, in which case the power transfer signal induces eddy currents resulting in a direct heating of the element.

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications, and in excess of 100 W and up to more than 1000 W for high power applications, such as e.g. kitchen applications.

In the following, the operation of the power transmitter 501 and the power receiving device 505 will be described with specific reference to an embodiment in accordance with the Qi Specification (except for the herein described (or consequential) modifications and enhancements) or suitable for the higher power kitchen specification being developed by the Wireless Power Consortium. In particular, the power transmitter 501 and the power receiving device 505 may follow, or substantially be compatible with, elements of the Qi Specification version 1.0, 1.1 or 1.2 (except for the herein described (or consequential) modifications and enhancements).

In conventional approaches, the output of a power transmitter typically comprises a resonance circuit including a transmitter coil driven by a full-bridge or half bridge converter as previously described.

Figure 6:
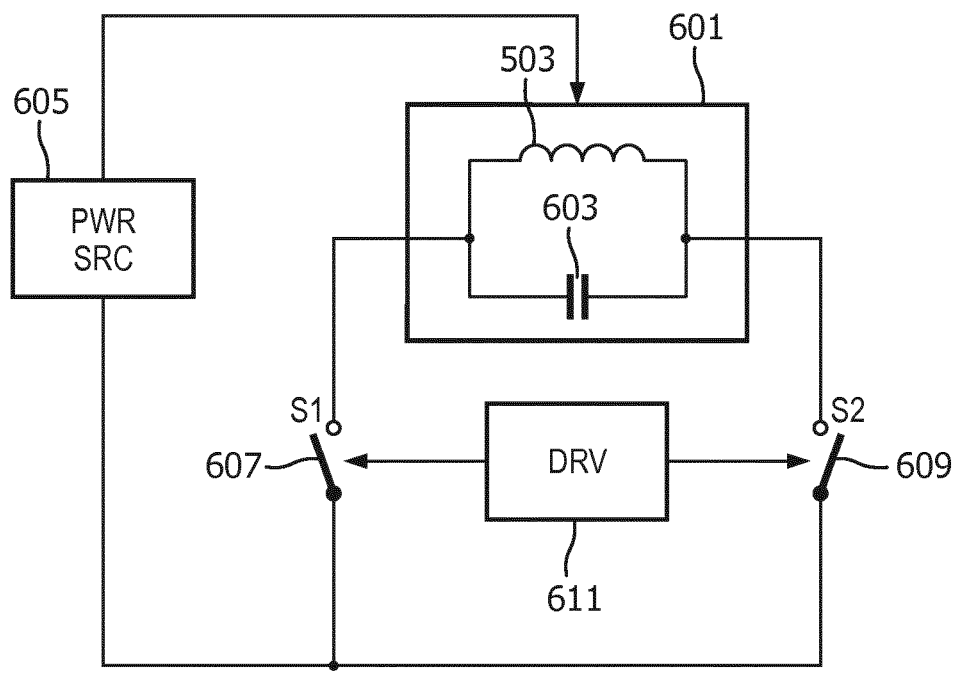
FIG. 6 illustrates an example of elements of an output circuit for a power transmitter in accordance with some embodiments of the invention.

However, in the system of FIG. 5, a different output circuit is used. An example of elements of an output circuit for a power transmitter 501 in accordance with some embodiments of the invention is illustrated in FIG. 6.

In the example, the power transmitter 501 comprises a parallel resonance circuit 601 which includes a capacitive impedance and an inductive impedance coupled in parallel. The inductive impedance comprises or consists in the transmitter coil 503. In the example of FIG. 6, the inductive impedance is formed by a single inductor, namely the transmitter coil 503, and the capacitive impedance is formed by a single transmitter capacitor 603 (in other embodiments other configurations are possible including configurations with a plurality of inductors or capacitors).

The inductive and capacitive impedances are coupled in parallel in a resonating configuration.

For clarity and brevity, the following description will focus on the inductive impedance being an (ideal) inductor corresponding to the transmitter coil 503 and the capacitive impedance being an ideal capacitor 603. For brevity, the pair of the transmitter coil 503 and the capacitor 603 will also be referred to as the resonating components.

It will be appreciated that in other embodiments the inductive impedance may be considered to represent any e.g. one port/two-terminal element which has an at least partial inductive impedance, i.e. which has an inductive reactance component, or in other words which has a complex impedance with a positive imaginary part.

It will also be appreciated that in other embodiments the capacitor 603 may be considered to represent any e.g. one port/two-terminal element which has an at least partial capacitive impedance, i.e. which has a capacitive reactance component, or in other words which has a complex impedance with a negative imaginary part.

The power transmitter further comprises a power source 605 which provides current to the output circuit and specifically to the parallel resonance circuit 601. The power source 605 provides at least one power source terminal and at least one current sink terminal with the current provided by the power source flowing from the power source terminal to the current sink terminal. In the circuit of FIG. 6, the power source terminal is coupled to the parallel resonance circuit 601 and it provides current to this.

The circuit further comprises a first switch element 607 with a first terminal coupled to a first end of the parallel resonance circuit 601 and a second terminal coupled to the current sink terminal of the power source 605. In the example, the first terminal is connected directly to the first end of the parallel resonance circuit 601 (directly to one of the junctions of the transmitter coil 503 and the capacitor 603) and the second terminal is connected directly to the current sink terminal. However, it will be appreciated that in other embodiments, the couplings may not be a direct connection but may provide a current path that includes other intervening components.

Similarly, the circuit comprises a second switch element 609 with a first terminal coupled to a second end of the parallel resonance circuit 601 and a second terminal coupled to the current sink terminal of the power source 605. In the example, the first terminal is connected directly to the other end of the parallel resonance circuit 601 (directly to the other junction of the transmitter coil 503 and the capacitor 603) and the second terminal is connected directly to the current sink terminal. However, it will be appreciated that in other embodiments, the couplings may not be a direct connection but may provide a current path that includes other intervening components.

The power source 605 is thus arranged to provide power and specifically current to the parallel resonance circuit 601. It is furthermore arranged to limit a rate of change of the current drawn from the power source terminal, i.e. it is arranged to restrict the current that is provided to the parallel resonance circuit 601. Thus, the power source 605 is not a voltage source that seeks to provide a constant voltage using potentially unlimited current. Rather, to a rate of change of the current is limited or given as a function of e.g. the voltage on the terminal.

In some embodiments, the restriction may be dependent on a voltage of at the power source terminal (e.g. relative to the current sink terminal). For example, the current or the rate of change of the current may be a monotonic and specifically a linear function of the power source terminal voltage.

Thus, in the example, the rate of change, dI/dt, of the current drawn from the power source terminal may be given as a function of the voltage $V_t$ on the terminal:

$$\frac{dI}{dt} = f(v_t)$$

where the function f(x) is a monotonically decreasing function of x. The function may in many embodiments be a substantially linear function, such as:

$$\frac{dI}{dt} = I' - kV_t$$

where I' and k are suitable design parameters.

As a specific example, the power source 605 may comprise an inductor between a voltage source and the power source terminal. In such an example, the current $$\frac{dI}{dt} = \frac{1}{L}(V_{dc} - V_t)$$

where L is the inductance of the inductor, $V_t$ is the voltage of the power source terminal, and $V_{dc}$ is the DC voltage of the internal voltage source.

It will be appreciated that in other embodiments, the rate of change restriction may be implemented by other means, such as e.g. by a solid state circuit or a microcontroller current regulation circuit.

The circuit furthermore comprises a driver 611 which is arranged to drive the switch elements 607, 609. Thus, the driver 611 generates switch or drive signals for the switch elements 607, 609 such that these switch state at appropriate times. It will be appreciated that in many embodiments, separate drive signals may be generated for each of the switch elements 607, 609. However, in some embodiments only a single drive signal may be generated and used to switch both switch elements 607, 609. For example, a drive signal may be generated that has four different possible levels with each level corresponding to one of the four possible switch configurations of the two switch elements 607, 609. These may both be fed the same signal and switch accordingly.

The drive signals are cyclic drive signals with a repeating pattern. The switch elements 607, 609 accordingly switches repeatedly/cyclically. Specifically, a cycle may include a first time interval in which the first switch element 607 is open (i.e. providing a higher impedance and typically corresponding to substantially being open circuit) and the second switch element 609 is closed (i.e. providing a lower impedance and typically corresponding to substantially being a closed circuit). During this first time interval, the parallel resonance circuit 601 performs (at least part of) a first half oscillation cycle.

In addition, the cycle may further include a second time interval in which the first switch element 607 is closed (i.e. providing a lower impedance and typically corresponding to substantially being a short circuit) and the second switch element 609 is open (i.e. providing a higher impedance and typically corresponding to substantially being open circuit). During this second time interval, the parallel resonance circuit 601 performs (at least part of) a second half oscillation cycle.

The two time intervals thus correspond to opposite and symmetric switch configurations and these couple the parallel resonance circuit 601 such that it performs a first half of an oscillation in the first time interval and a second half of the oscillation in the second time interval. The cyclic switching of the switch elements 607, 609 can accordingly cause the parallel resonance circuit 601 to oscillate.

A related operation is performed in the so-called Royer oscillator or Royer inverter. In such a circuit, the inductor has an additional winding in which a voltage is induced by the magnetic field generated from the main inductor winding(s). This voltage is in the Royer configuration used to control the switching. The system may provide a very low complexity oscillation wherein the timing of the switching is automatically controlled by the inductor signal such that oscillation automatically occurs. The Royer oscillator has the advantage of being low complexity and reliable and is used for example to provide suitable voltages for Compact Fluorescent Lamps (CFLs).

The approach of FIG. 6 may provide some of the advantages that are known from a Royer oscillator. In particular, the approach may provide a substantially reduced voltage rate of change (dV/dt) at both the nodes of the switch elements 607, 609 and the terminals of the transmitter coil 503. It may furthermore provide a well-defined peak voltage at the terminals of the switch elements 607, 609.

However, a conventional Royer oscillator or inverter also has a number of disadvantages. In particular, the operating frequency is heavily dependent on component values, such as the saturation effects of the inductor or the values of the capacitor and inductor etc. This may often be problematic as the component tolerances and drift etc. will have a significant impact on the resulting operating frequency. Further, it makes control of the resonance frequency very difficult and this must often in practice simply be controlled by selecting component values and accepting any resulting uncertainty and variance of the resonance frequency.

This may be a significant problem in a wireless power transfer system, such as one in accordance with the principles of the Qi specification, where the resonance frequency should be carefully controlled to adapt the power transfer characteristics and/or to maximize efficiency.

A particular problem for such a system is that the coupling to the power receiver is not only typically unknown but also typically varies substantially and often quickly and unpredictably. For example, a user may suddenly move the power receiver. The change in loading will result in a change in the effective inductance of the transmitter coil and this can result in a substantial change in the resonance frequency. This can lead to inefficient power transfer or may e.g. result in overvoltage conditions occurring at the power receiver as the power control loop will be too slow to immediately compensate for the changes. Similar effects may occur as a function of e.g. a change in the load at the power receiver.

The system of FIG. 6 may in many embodiments address or mitigate one or more of these disadvantages.

This is achieved by the drive signal driving the circuit such that each cycle does not only include the first and second time intervals in which one switch element is open and one is closed, but also includes at least one time interval, and typically two time intervals, in which both switch elements 607, 609 are closed.

Thus, in the circuit of FIG. 6, each (driver) cycle comprises a first time interval in which the parallel resonance circuit 601 performs at least part of a first half of a resonance cycle (and typically substantially the full half of the resonance cycle), a second time interval in which the parallel resonance circuit 601 performs at least part of a second half of a resonance cycle (and typically substantially the other full half of the resonance cycle), and at least a third time interval in which the switch elements 607, 609 prevents at least one state change of the transmitter coil 503 and the capacitor 603. In this third time interval, the voltage over the parallel resonance circuit 601 may specifically be kept fixed at substantially zero (since both switch elements 607, 609 are closed, i.e. in the conducting state).

An advantage of the system is further that the power provided to the parallel resonance circuit 601 is automatically adapted to the power extracted by the power receiver (and losses) from the power transfer signal. Indeed, whereas the rate of change of the current is controlled, the absolute (average) current may vary to provide the required power. Indeed, the average current and power provided from the power source may automatically adapt to the level that matches the power being extracted from the power transfer signal.

Figure 7:
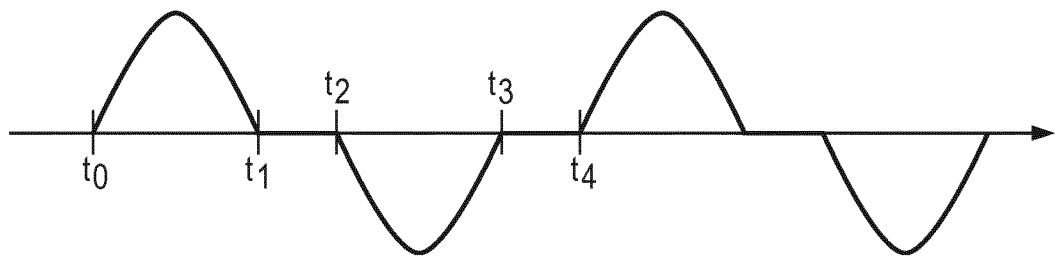
FIG. 7 illustrates an example of signals of an output circuit for a power transmitter in accordance with some embodiments of the invention.

FIG. 7 illustrates an example of the voltage over the parallel resonance circuit 601 (and thus over the transmitter coil 503) that may be experienced in such a system. In the example, a cycle starts at to with the driver 611 switching the first switch element 607 to a closed state and the second switch element 609 to an open state. The parallel resonance circuit 601 begins an oscillation with the voltage increasing from zero and then falling back to zero as for a typical resonance behavior. The voltage returns to zero at $t_1$ at which point, the driver 611 further switches the second switch element 609 to a closed state such that both switch elements 607, 609 are in a closed state. Accordingly, the voltage over the parallel resonance circuit 601 is kept constant at zero, and effectively the parallel resonance circuit 601 is frozen at the current state. It is noted that as this also means that the voltage over the transmitter coil 503 is zero and consequently that the current in this is maintained constant.

At time $t_1$, the driver 611 controls the first switch element 607 to open such that only the second switch element 609 is now closed. Accordingly, the parallel resonance circuit 601 now begins the second half of the oscillation (the current from the transmitter coil 503 now runs into the capacitor 503) which has the opposite voltage of the first half of the oscillation. At $t_3$ the voltage returns to zero and the driver 611 again switches the first switch element 607 to the closed position such that both switch elements 607, 609 are closed. This again freezes the parallel resonance circuit 601 and stops the oscillation. At $t_4$ the driver 611 again switches the second switch element 609 to the open position thereby starting the next cycle.

Thus, in the example, the first interval in which the first switch element 607 is closed and the second switch element 609 is open corresponds to the interval from $t_0$ to $t_1$, the second interval in which the first switch element 607 is open and the second switch element 609 is closed corresponds to the interval from $t_2$ to $t_3$, and the third interval in which both switch elements 607, 609 are closed corresponds to the interval from $t_1$ to $t_2$, or to the interval from $t_3$ to $t_4$.

An effect of the operation of the circuit of FIG. 6, as exemplified by FIG. 7, is that the parallel resonance circuit 601 as a consequence of the driving of the switch elements 607, 609 and the addition of the "freezing" intervals, behaves similarly to a parallel resonance circuit with a resonance frequency (henceforth referred to as the effective resonance frequency) of $1/(t_4-t_0)$ rather than the frequency (henceforth referred to as the natural resonance frequency) given by the freely running resonance:

$$f_{nr} = \frac{1}{2\pi\sqrt{LC}}$$

where L is the (effective) inductance of the transmitter coil 503 and C is the capacitance of the capacitor 603.

Thus, rather than the output circuit operating with a resonance frequency given directly by the component values, the operation of the circuit of FIG. 6 provides an effective resonance frequency which is determined by the timings of the intervals of the cycle. Thus, the resonance frequency can be modified simply by modifying the timing of the time intervals in which both switch elements 607, 609 are open, and thus in which the parallel resonance circuit 601 is frozen. Thus, each cycle includes time intervals in which the resonance is temporarily frozen. These intervals represent a fraction of each cycle interval/period and will henceforth for brevity be referred to as fractional time intervals.

In the system, the driver 611 may adjust the effective resonance frequency by adapting the duration of the fractional time intervals. This may provide a very efficient and accurate control of the effective resonance frequency. For example, if the system adapts the duration of the fractional time interval to compensate for variations in the natural resonance frequency, e.g. due to component tolerances, a constant effective resonance frequency can be achieved.

As a specific example, a user may suddenly move a power receiver resulting in a change in the coupling and thus in the effective inductance of the transmitter coil 503. This will result in a changed natural resonance frequency and the first and second time intervals (the half oscillations) will change duration. However, if the system changes the duration of the fractional time interval correspondingly such that the overall cycle time is unchanged, the effective resonance frequency will be kept constant. Further, as will be described, such an adaptation may in many embodiments be achieved effectively, with low complexity, and substantially instantly. Thus, the approach allows for a very effective and accurate approach for e.g. keeping the power transmitter resonance frequency constant despite changes in e.g. coupling or loading. This may provide significant advantages. For example, it may prevent or reduce overvoltage effects in the power receiver resulting from e.g. sudden changes in the coupling between the power transmitter and the power receiver.

For example, if the switch S at the power receiver side is suddenly switched off, then an overvoltage is likely to occur at the power receiver. Such an overvoltage may possibly be fairly substantial and could even potentially in some scenarios cause malfunction or faults at the power receiver. However, in the described approach, the system will automatically and immediately adapt to the changed load condition and thus the overvoltage issue may be substantially mitigated.

As another example, the approach may provide improved operation in a system that e.g. uses frequency modulation (FM) of the power transfer signal. Indeed, rather than changes in the drive/operational frequency resulting in significant amplitude variations due to the proximity to the resonance frequency changing, the current system inherently adapts the effective resonance frequency to follow that the drive frequency. Thus, effectively the power transmitter continues to operate at the resonance frequency even when the drive frequency changes. This results in substantially reduced FM to AM conversion and thus provides improved communication and more efficient power transfer. Further, the reduced amplitude variations may facilitate e.g. detection of load modulation applied to the power transfer signal by the power receiver.

Figure 8:
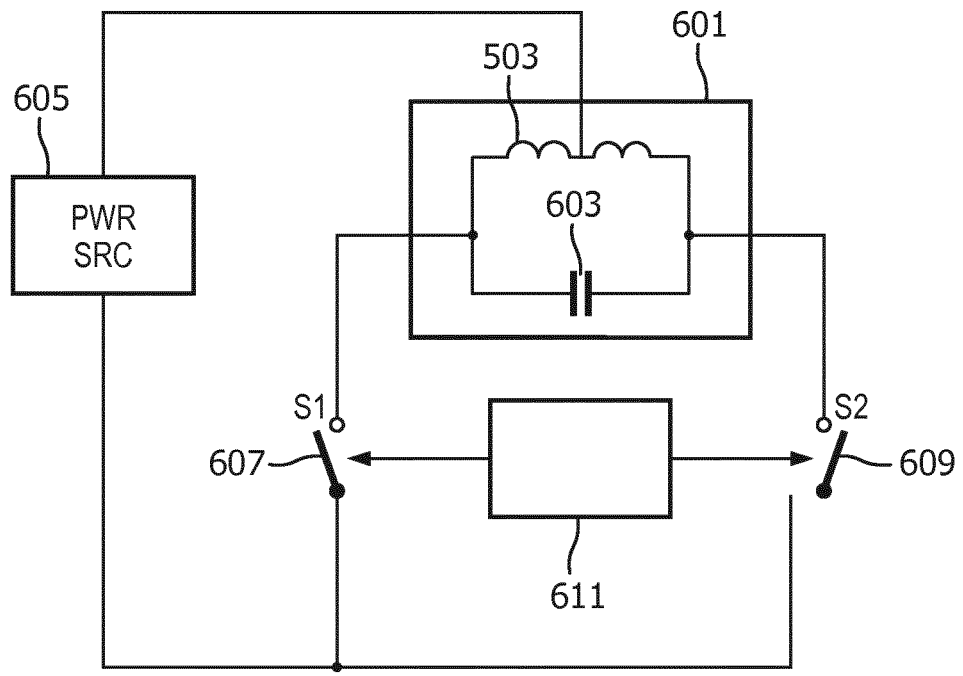
FIGS. 8-12 illustrate an example of elements of an output circuit for a power transmitter in accordance with some embodiments of the invention.

In some embodiments, the transmitter coil 503 may have a center tap and the power source 605 may provide current to this center tap. Such an example is illustrated in FIG. 8. In the example, the transmitter coil 503 can be perceived as split into two separate transmit sub-coils with the (restricted) current from the power source 605 being provided to the connection of these sub-coils. The switches may be operated as previously described resulting in cycles with a first interval corresponding to a first half oscillation, a second interval corresponding to a second half oscillation, and a third (and possibly more) time interval(s) in which both switches are on, and the parallel resonance circuit 601 is frozen with a constant voltage.

In other embodiments, the power source may have two power source outputs that are coupled to the opposite ends of the parallel resonance circuit 601. Such an example is illustrated in FIG. 9.

Thus, in this approach, the power source 605 comprises a first power source terminal coupled to a first end of the parallel resonance circuit 601 and a second power source terminal coupled to the second end of the parallel resonance circuit 601. The two power source terminals are individually/independently current rate of change limited. Thus, any restrictions to the rate of current imposed on the first terminal is independent of the conditions on the other terminal (and vice versa). For example, the rate of change of the current drawn from the first terminal does not depend on the current drawn from, or the voltage of, the second terminal (and vice versa).

Figure 9:
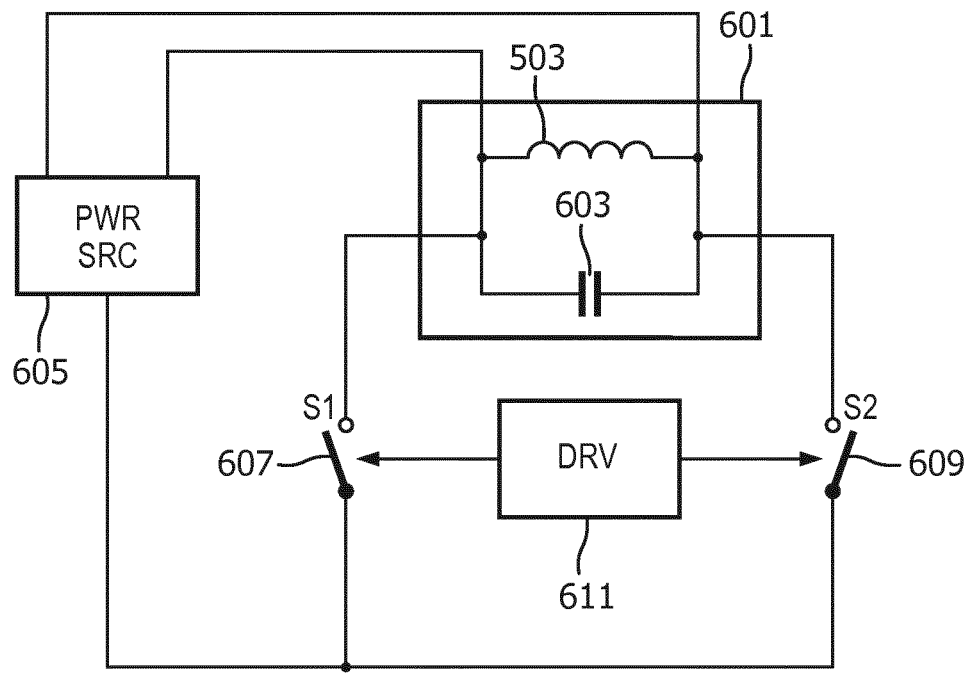

The description previously provided with respect to the single power source terminal may be individually applied to each of the power source terminals of the example of FIG. 9.

Again, the driver 611 may be arranged to generate drive/switch signals as previously described, i.e. drive signals may be generated to provide cycles with a first interval corresponding to a first half oscillation, a second interval corresponding to a second half oscillation, and a third (and possibly more) time interval(s) in which both switches are on and the parallel resonance circuit 601 is frozen with a constant voltage.

Figure 10:
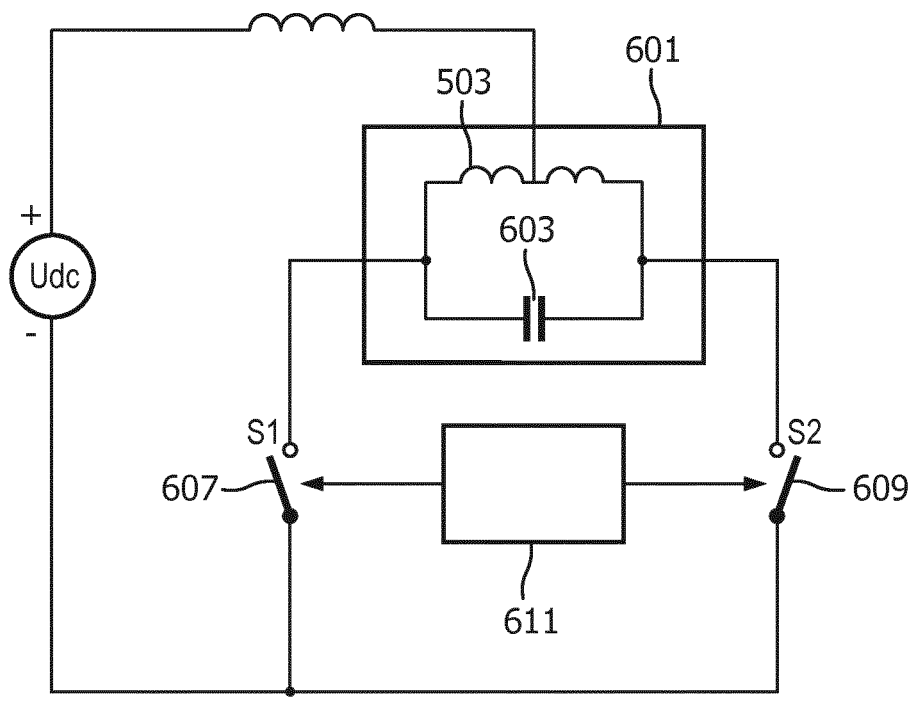
Figure 11:
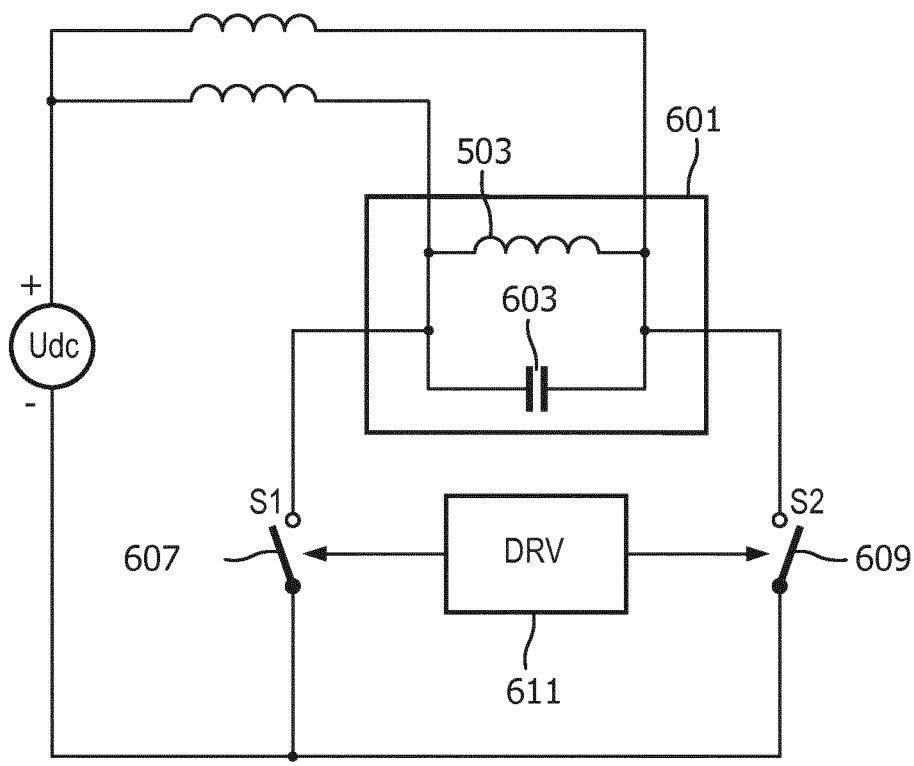

In many embodiments, the power source may comprise an output inductor in series with the output terminals. Indeed, in many embodiments, the power source may (for each output terminal) comprise an output inductor coupled to a voltage source (and specifically a constant voltage source). Examples of such implementations are illustrated in FIGS. 10 and 11.

An inductor is inherently a current restricting element whereas a voltage source (in particular a constant voltage source) is inherently not current limited. However, the combination of an inductor in series with a voltage source inherently provides a current restriction by the rate of change of the current being restricted. Indeed, as previously mentioned the rate of change of current of the inductor is given by the equation:

$$\frac{dI}{dt} = \frac{1}{L}(V_{dc} - V_t)$$

where L is the inductance of the inductor, $V_t$ is the voltage of the power source terminal, and $V_{dc}$ is the DC voltage of the internal voltage source.

Thus, even if the terminal voltage $V_t$ is substantially zero, e.g. due to the corresponding switch element being closed, the current will only increase with the rate given as:

$$\frac{dI}{dt} = \frac{V_{dc}}{L}$$

The inductor may typically be selected to have an inductance which is sufficiently high to result in the current changes during the intervals of a cycle being relatively low.

The use of inductors to control the current may provide advantageous performance in many embodiments. In particular, it may provide low complexity and efficient current provision with low losses (e.g. compared to using resistors or many constant current circuits).

In the described circuits, the power transmitter modifies the resonance cycles of the parallel resonance circuit 601 to include fractional time intervals in which the state of the circuits are kept static by the two switch elements 607, 609 both being open at the same time. Accordingly, the modified cycle time is longer than the natural cycle time of a freely running parallel resonance circuit 601, and thus an effective resonance frequency which is lower than the natural resonance frequency is achieved.

The parallel resonance circuit 601 will be designed to have a natural resonance frequency which is higher than the desired operating frequency of the driver, and indeed will typically be designed such that the worst case natural resonance frequency (i.e. considering the effect of coupling, component tolerances, drift etc.) will always be higher than the highest desired operating frequency. This will allow the effective resonance frequency to be adapted to be equal to the operating frequency.

In many embodiments, a cycle duration for a cycle of the cyclic drive signal, and thus accordingly the cycle time for the modified operation of the parallel resonance circuit 601, will be set to exceed the resonance period time for the parallel resonance circuit 601 when freely running by no less than 5%, or in some embodiments advantageously no less than 10%, 15%, 20% or even 30%. Thus, the fractional time intervals form a substantial part of the cycle, and this provides a relatively large adaptation range which can compensate effectively for practically experienced variations in coupling, loading, tolerances, drift etc.

In many embodiments, the duration of the fractional time interval(s) do not exceed 30%, 40%, 50%, or 60% respectively of the total duration of a cycle time of the drive signals (and of the effective resonance cycle time). This may ensure that the parallel resonance circuit 601 still exhibits many characteristics corresponding to a free running resonance circuit (and thus e.g. provide efficient power transfer).

In many embodiments, the power transmitter 501 is arranged to synchronize at least one of an end time and a start time of the fractional time intervals to a property of a signal of the parallel resonance circuit. For example, in the approach described previously, the driver 611 is arranged to synchronize the switch signals causing both switch elements 607, 609 to be closed to be aligned with the zero crossing of the voltage over the parallel resonance circuit 601. This may for example be achieved by including a sensing circuit which detects when the absolute value of the capacitor voltage falls below a threshold very close to zero.

As another example, the system may include a current sensor sensing the current through the transmitter coil 503. The zero crossing of the voltage over the capacitor corresponds to the peak of the current through the transmitter coil 503 and accordingly this may be detected and used to set the start time for the fractional time interval(s).

In many embodiments, the start time of the fractional time intervals may be set to substantially align with a zero crossing of the voltage over the parallel resonance circuit 601 (i.e. with the voltage reaching zero volt corresponding to a change of the polarity of the voltage if the parallel resonance circuit 601 had not been interrupted by the fractional time interval). Further, the end times of the fractional time intervals may be set with a frequency corresponding to the desired effective resonance frequency. Thus, the time between subsequent times at which e.g. the first switch element 607 is switched off may be set equal to the desired effective cycle time. This time interval may be independent of the signals of the parallel resonance circuit 601, and specifically may be independent of the speed of the actual oscillation currently occurring, i.e. it may be independent of the current natural frequency of the parallel resonance circuit 601. Accordingly, it may be independent of the current loading, exact component values etc.

Indeed, such an approach will result in a system wherein the start of a fractional time interval is determined by the current instantaneous resonance operation of the parallel resonance circuit 601 when allowed to resonate freely, whereas the end of the fractional time interval is set independently of this operation but with a fixed frequency. As a result, the system will automatically adapt the fractional time interval to have a duration resulting in the overall cycle time corresponding to the desired operating frequency.

In many embodiments, the start of a fractional time interval may accordingly be set to be aligned with a zero crossing of a voltage over the parallel resonance circuit 601 whereas the end of the fractional time interval may be set by the drive signal driving at least one of the switch elements 607, 609 to switch from a closed state to an open state. The drive signal may be arranged to generate this transition with a frequency corresponding to the desired operating frequency/effective resonance frequency.

The previous description has focused on adapting the specific drive signals to cause the switch elements 607, 609 to switch at the start and end of the fractional time intervals. However, in some embodiments, the switch elements 607, 609 may automatically detect a characteristics of the parallel resonance circuit 601 and switch the status accordingly. Specifically, rather than adapt the drive signal to have transitions when the zero crossings occur, the switch may automatically switch to a closed state when the voltage over the parallel resonance circuit 601 falls below a threshold.

Figure 12:
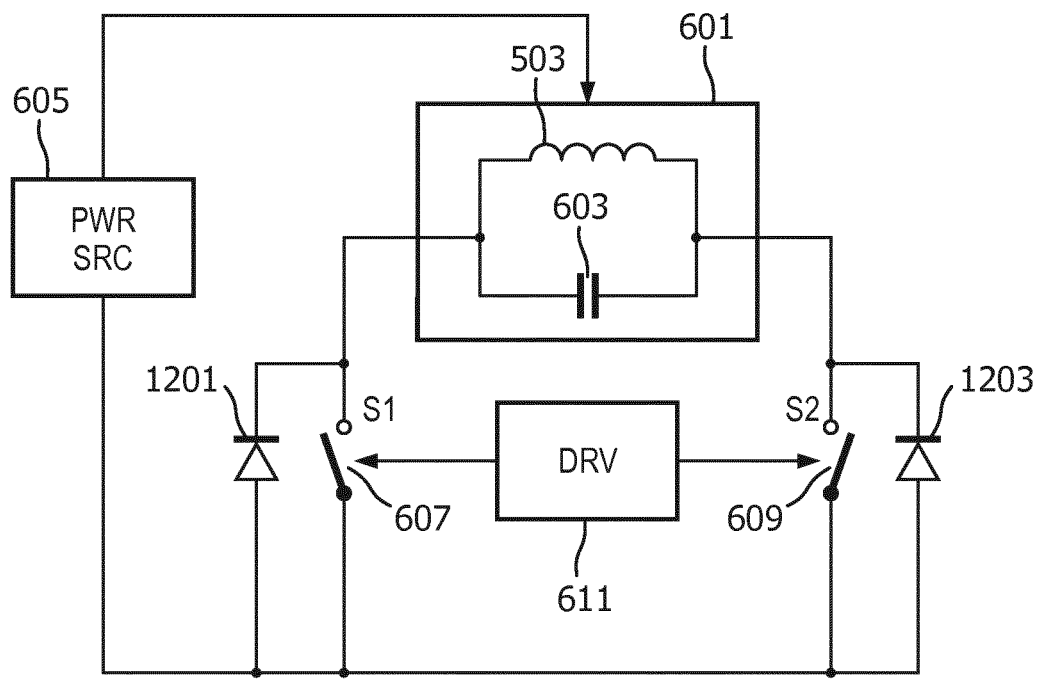

Such an operation may in many embodiments be achieved with low complexity by the use of a rectifier. For example, FIG. 12 illustrates how the system of FIG. 6 could be modified to include rectifiers automatically switching the switch elements 607, 609 on to start fractional time intervals. In the examples, rectifiers 1201, 1203 are added to the controlled switches (the rectifiers are considered part of the respective switch elements 607, 609 but it will be appreciated that they could equally be considered e.g. part of the driver 611).

The operation of this circuit may be understood by considering FIG. 7. At time instant $t_o$ the driver 611 changes the drive signal for the first switch element 607 such that this switches to the open state. This results in the current flowing through the transmitter coil 503 (which during the fractional time interval has been frozen at a constant non-zero value due to the voltage over it being substantially zero) being directed to the capacitor 603 resulting in the voltage over the capacitor 603 gradually increasing. This of course also means that the voltage over the transmitter coil 503 is increasing and this causes a change in current (dI/dt) which reduces the current through the transmitter coil 503. The current through the transmitter coil 503 thus reduces. At some stage, the current through the transmitter coil 503 will reach zero, i.e. it will change direction. This corresponds to the peak in the capacitor voltage. The current will now flow in the other direction and thus out of the capacitor 603 and accordingly the voltage over this will reduce. However, the capacitor voltage is still positive so the current through the transmitter coil 503 will continue to increase and the voltage will continue to decrease (at an increasing rate).

This will continue until the voltage over the parallel resonance circuit 601/capacitor 603 reaches zero (or rather slightly below zero for a typical non-ideal rectifier such as a diode). At this point, the rectifier/diode 1201 will switch on and a current path will be formed through the second switch element 609 and the rectifier 1201. Thus, effectively both switch elements 607, 609 will now be closed and a current path is formed that freezes the voltage over the parallel resonance circuit 601 at substantially zero. Thus, the switching on of the rectifier 1201 corresponds to $t_1$ and the start of the fractional time interval.

The situation is now unchanged until $t_3$ when the second switch element 609 switches off. The situation at this end is symmetrically identical to the situation at to and thus the described operation repeats (but with the voltage over the parallel resonance circuit 601 and the current through the transmitter coil 503 of course having the opposite sign).

The approach allows for a very efficient and practical operation which allows low complexity control and switching and which further has a low component count. The rectifiers 1201, 1203 will automatically initiate the fractional time intervals at the appropriate time for the current conditions of the parallel resonance circuit 601 and the drive signals can simply be set to have a fixed frequency equal to the desired operating frequency. The duty cycle of the drive signals is not critical and indeed often they may be generated to have fixed duty cycles (e.g. of, say, 55%).

Figure 13:
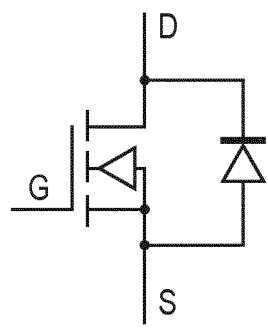
FIG. 13 illustrates a diagram MOSFET with a body diode.

A particularly advantageous approach can be achieved by implementing the switch elements using Field Effect Transistors (FETs) such as specifically MOSFETs. Indeed, such FETs have an inherent body diode between the drain and source as evidenced by the FET equivalent circuit of FIG. 13 (for an N-channel FET). In some embodiments, the switch elements 607, 609 may be formed by FETs and the rectifiers may be implemented by the body diodes of the switching FETs. Thus, a very low complexity implementation can be achieved which directly adapts to changes in the parallel resonance circuit 601 operating conditions to provide a constant effective resonance frequency simply by driving the FETs with simple square-wave signals having a frequency equal to the desired operating frequency (with the effective resonance frequency automatically aligning to this).

Figure 14:
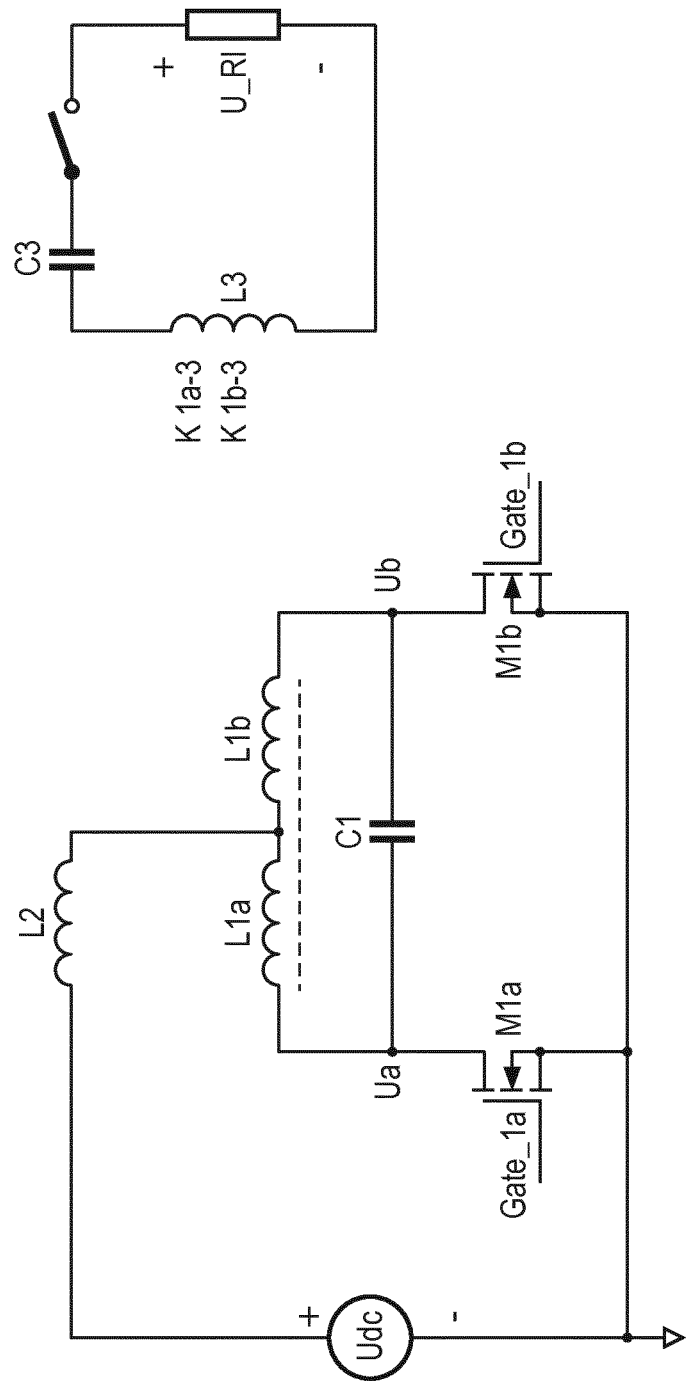
Figure 15:
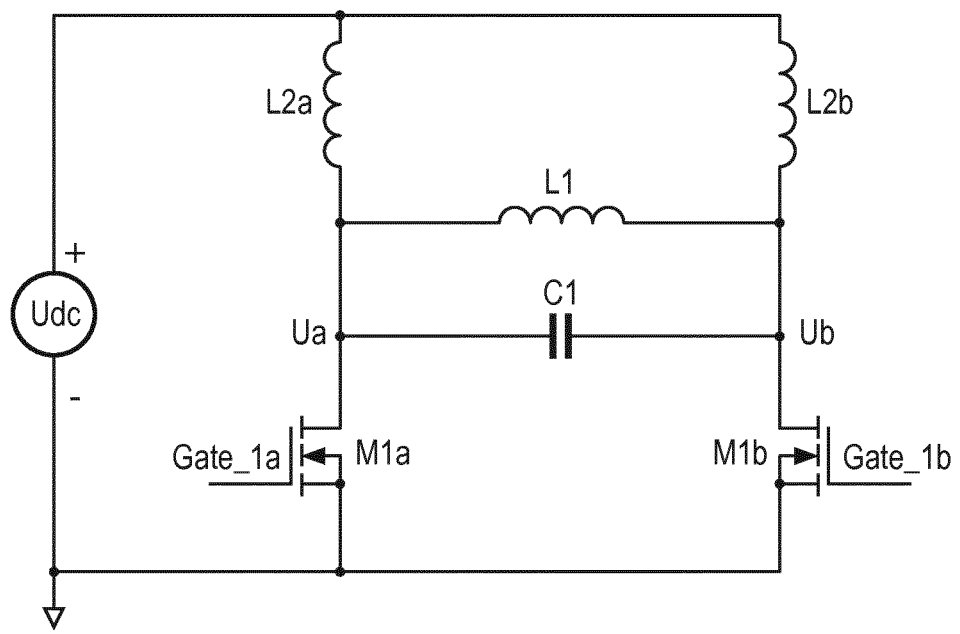

FIGS. 14 and 15 illustrate specific implementations that include most of the described features (FIG. 14 also illustrates the equivalent circuit for the power receiver but this is for brevity not repeated in FIG. 15). The circuits may provide very efficient, yet low complexity, output circuits for a wireless power transmitter.

The circuits provide very advantageous properties in addition to the low complexity and efficient driving. In particular, they exhibit slow voltage gradients (dV/dt) on the end points of the parallel resonance circuit 601. Also, the peak voltage at the nodes Ua and Ub tend to be well-defined (Upeak≈π*Udc). Due to the fact that the amplitude of the voltage across C1 is well-defined, the overvoltage at the receiver side with disconnected load is limited and predictable. Although the damping of the parallel resonant network L1a-L1b & C1 disappears at no-load, the voltage across the terminals of the transmitter coil are controlled back to π*Udc, thanks to the intrinsic voltage control loop around inductor L2.

The circuit of FIG. 14 includes a transmitter coil L1 with a center tap. This may be impractical to implement in many embodiments and the modified circuit of FIG. 15 may avoid such a center tap. In this example, "current source" coils, L2a and L2b, are connected to the respective ends of the parallel resonance circuit 601. Although this increases the number of components in the inverter, the benefits of this arrangement may be substantial. Indeed, it may exhibit many of the properties of the approach of FIG. 14 without requiring a tap of the transmitter coil. Indeed, it may also exhibit slow dV/dt's and limited peak voltages at the nodes Ua and Ub, and may ensure that any overvoltage at the receiver side with a disconnected load is limited and predictable.

Figure 21:
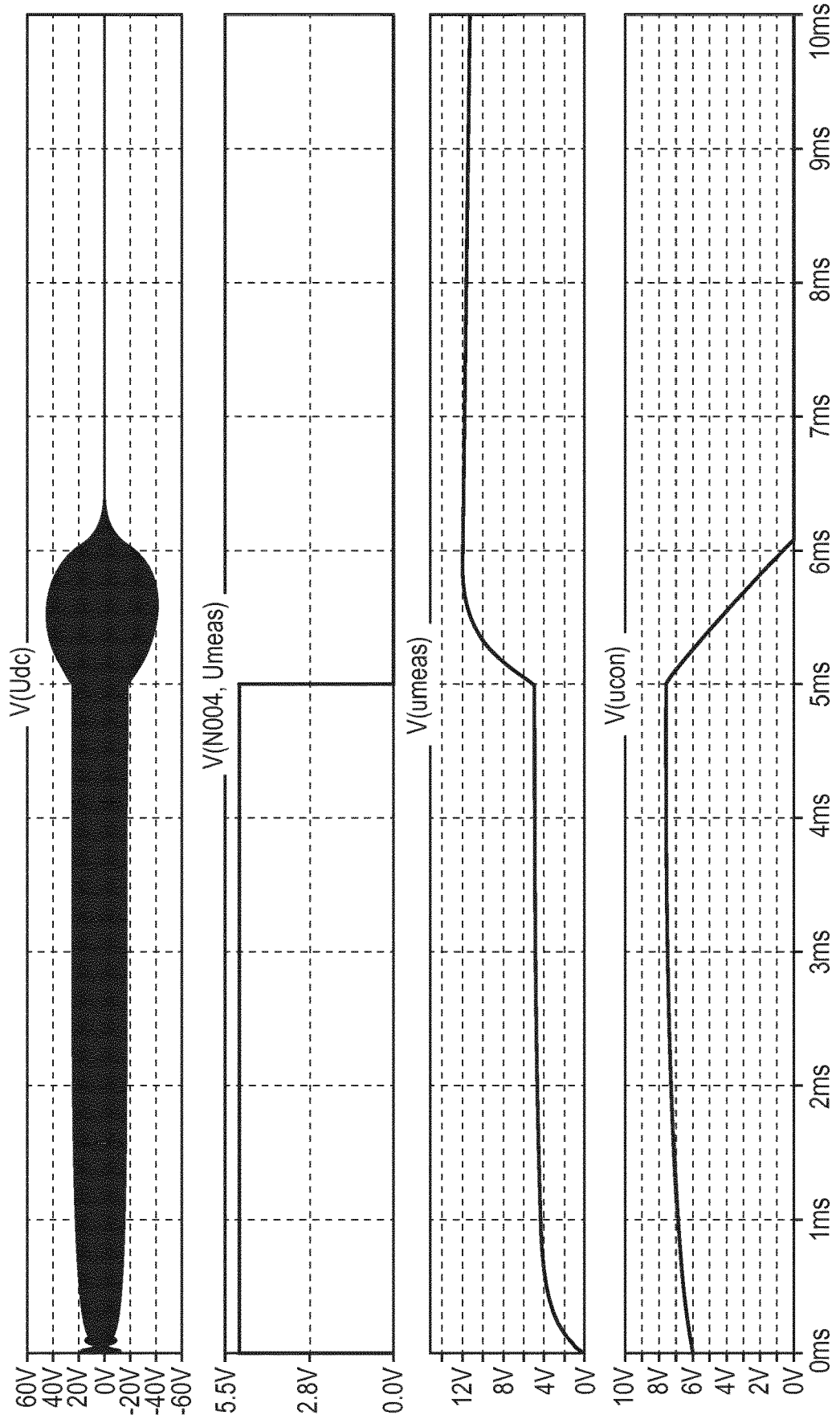
FIG. 21 illustrates an example of signals of a power receiver and a power transmitter.
Figure 22:
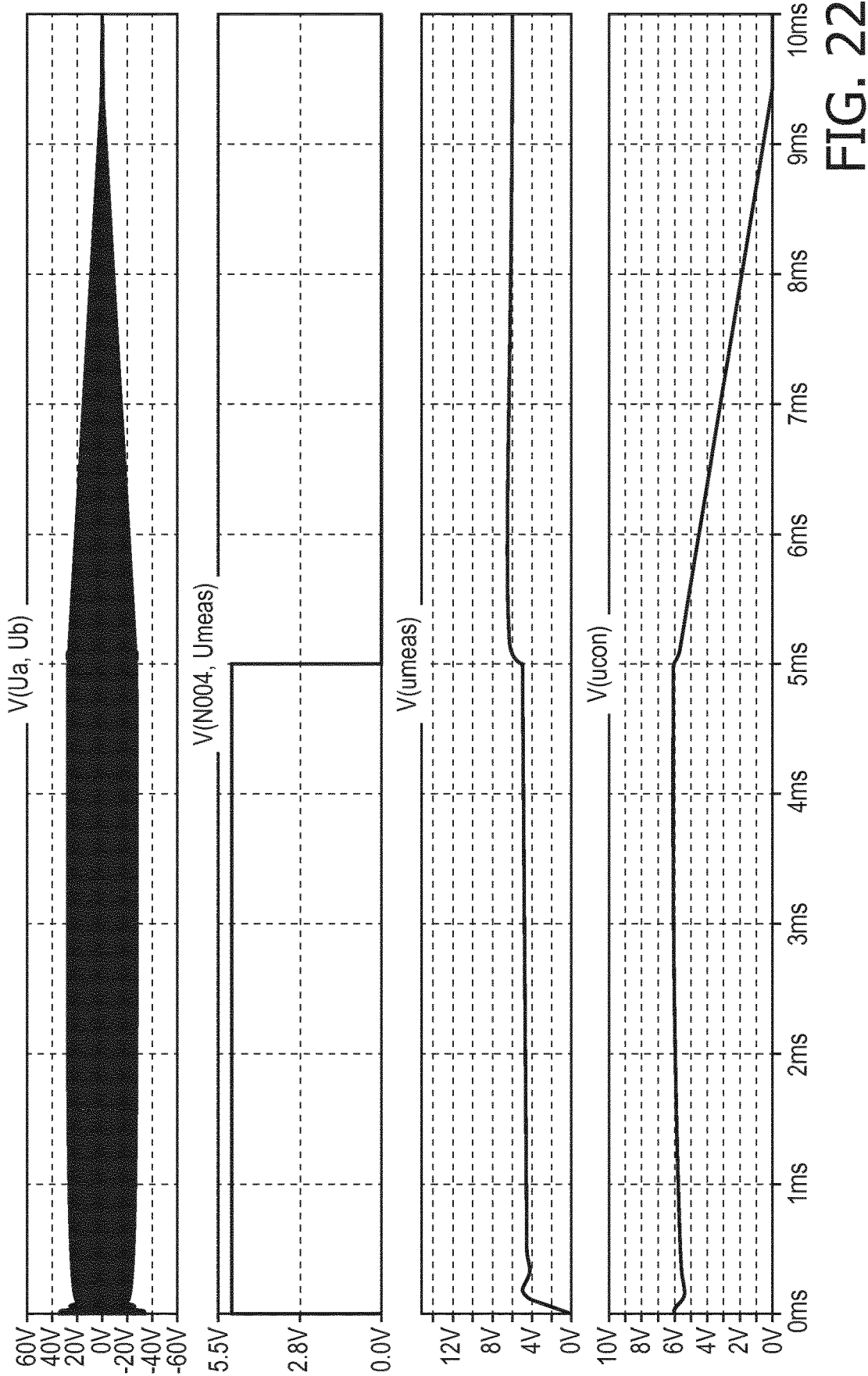
FIG. 22 illustrates an example of signals of a power receiver and a power transmitter in accordance with some embodiments of the invention.

The overvoltage improvement may be illustrated by the examples of FIGS. 21 and 22 where the power receiver load is disconnected at t=5 ms. FIG. 21 illustrates an example of a simulation for a traditional full bridge inverter. The first subfigure shows the voltage over the resonance circuit, which as can be seen may shows a significant increase just after the load is disconnected. Thus, a high peak voltage occurs. The second subfigure illustrates the load transition. The third subfigure shows the output voltage of the power receiver. As can be seen this increases dramatically from the nominal 5V to a peak of over 12V. The fourth subfigure shows the supply voltage of the inverter as this is controlled by the power control loop of the system. As can be seen, this control loop does reduce the voltage but this cannot prevent the overvoltage conditions at the receiver or over the resonance circuit.

FIG. 22 shows the corresponding example for the circuit of FIG. 15. The first subfigure again shows the voltage over the parallel resonance circuit. As can be seen, there is no overvoltage condition but rather the peak voltage follows the supply voltage $U_{dc}$ illustrated in the fourth subfigure. Further, as shown in the third subfigure, the overvoltage at the power receiver is reduced substantially and indeed the peak voltage does not increase much above 6V. Thus, a much improved performance and reaction to load changes is achieved.

Further, the circuits provide excellent and simple compensation for variations in loading or coupling that may result in changed effective inductance of the transmitter coil 503. Indeed, the approach will automatically adapt the fractional time intervals to have the necessary duration to modify the current natural resonance frequency to the desired effective resonance frequency. Thus, if the coupling or loading changes, the system will automatically and instantly adapt the duration of the fractional time intervals to compensate for this change.

In the following the circuit of FIG. 15 will be described in more detail.

In the implementation, the drive signals of Gate_1*a* and Gate_1*b* are, as previously described, controlled such that they cause a "freeze" of the Voltage Ua and Ub during a fraction of the cycle time of the resonance tank. This "freeze" time significantly reduces the effect of a change of the resonance frequency of the tank and/or a change of the operating frequency.

First, the operation will be considered if no fractional time intervals were employed.

As a specific example, the desired resonance frequency Fres of the transmitter may be set to 100 kHz and the coupling factor may be zero, i.e. K=0 (which means no receiver in proximity of the transmitter). The effective inductance value Lres of the resonant tank can then be calculated from the following formulae:

$$Lres := \frac{[(L2a + L2b) \cdot L1]}{(L2a + L2b + L1)}$$

For capacitance C1 this yields:

$$C1 := \frac{1}{(2 \cdot \pi \cdot Fres)^2 \cdot \frac{[(L2a + L2b) \cdot L1]}{(L2a + L2b + L1)}}$$

Figure 16:
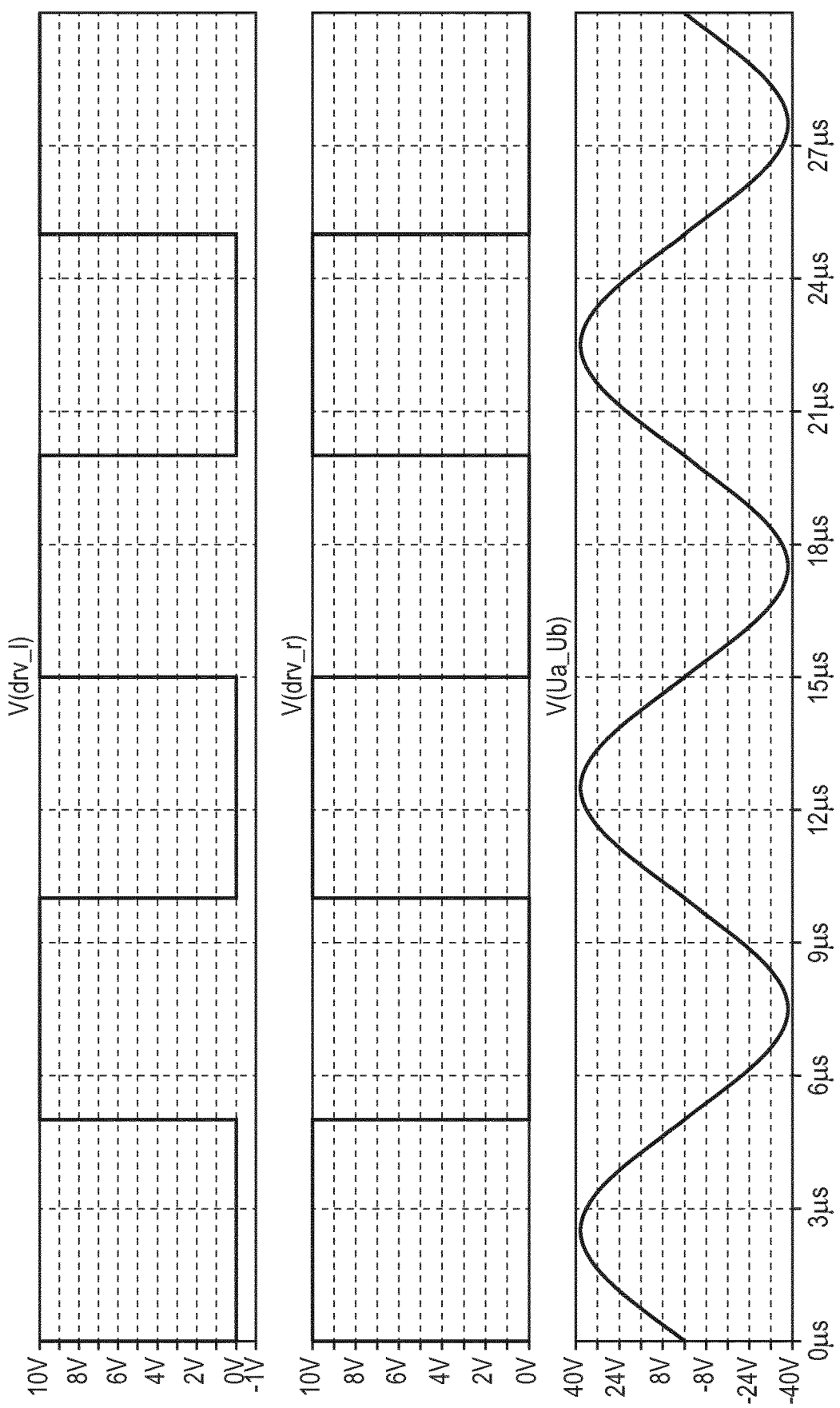
FIGS. 16-20 illustrate an example of signals of an output circuit for a power transmitter in accordance with some embodiments of the invention.

If Udc=12V, L1=12 u, L2*a*=L2*b*=33 u, Fres=100 kHz, Fop=100 kHz and K=0, the value for C1 becomes 250 nF in the case that a direct driving with no fractional time intervals is used. The drive signals and voltage waveform may then be as shown in FIG. 16.

Basically, MOSFETs Ml*a* and Ml*b* are driven by two gate drive signals with a duty cycle of 50% each. Furthermore, the two gate drive signals are 180 degrees out of phase. As can be seen, the voltage across the parallel resonant tank appears to be an almost perfect sine wave, with a peak voltage equal to π*Udc=38V (in some examples some transient switch effects may cause some distortion to the sine wave).

Figure 17:
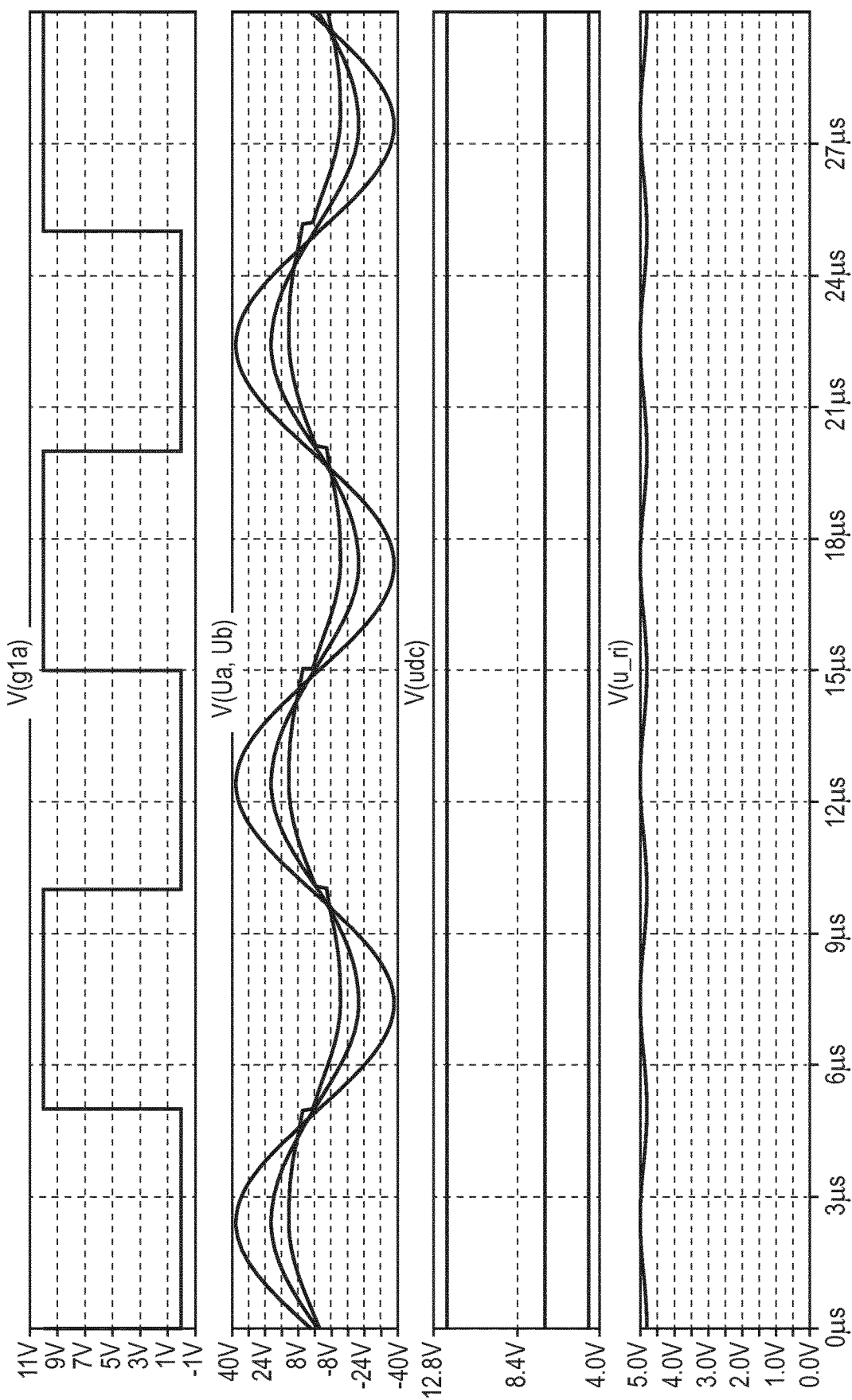

If a receiver is brought into the proximity of the transmitter, the coupling factor K is no longer zero. In FIG. 17 the effect on the waveform across the resonant tank voltage is shown for K=0, 0.25 and 0.5 respectively. Furthermore, FIG. 17 illustrates the setting of the voltage Udc required for a voltage U_RL at the receiver of 5V.

If K=0 the resonant tank voltage is an almost perfect sine wave. The input voltage Udc equals the maximum value of 12V and the output voltage U_RL is zero.

For K>0 the resonant tank voltage is no longer an almost perfect sine wave voltage but shows steep edges near the zero crossing, especially at K=0.5. This is due to the effective inductance of the transmitter coil L1 being increased due to the loading by the receiver, and thus the parallel resonance circuit has not finished its half oscillation by the time the FETs are switched. Thus, in this case, zero voltage switching is no longer achieved. The sine wave no longer "fits" inside a 100 kHz drive regime and this will have a substantial impact on e.g. EMI, result in increased losses etc. Furthermore, the better the coupling factor K, the lower the required input voltage Udc needed to control the output voltage U_RL to 5V. Two mechanisms come into play if K>0. First, the effective inductance value Lres of the resonant tank increases because the inductance value for L1 increases. If L1 is in proximity of L3, the ferrite of receiver coil L3 causes the inductance value of L1 to increase. Second, if K>0, the receiver circuit damps the parallel resonant tank, and also distorts its voltage wave form.

To make the sine wave fit again in a drive regime, the drive frequency need to be adjusted downwards. This could be achieved by operating the inverter in a self-oscillating mode based on a second switch winding being coupled to the transmitter coil. The disadvantage of this is that the operating frequency of the inverter becomes dependent on the coupling factor. This could result in the transmitter resonance frequency and the receiver resonance frequency deviating substantially from each other and this may substantially reduce the overall efficiency of the system.

Figure 18:
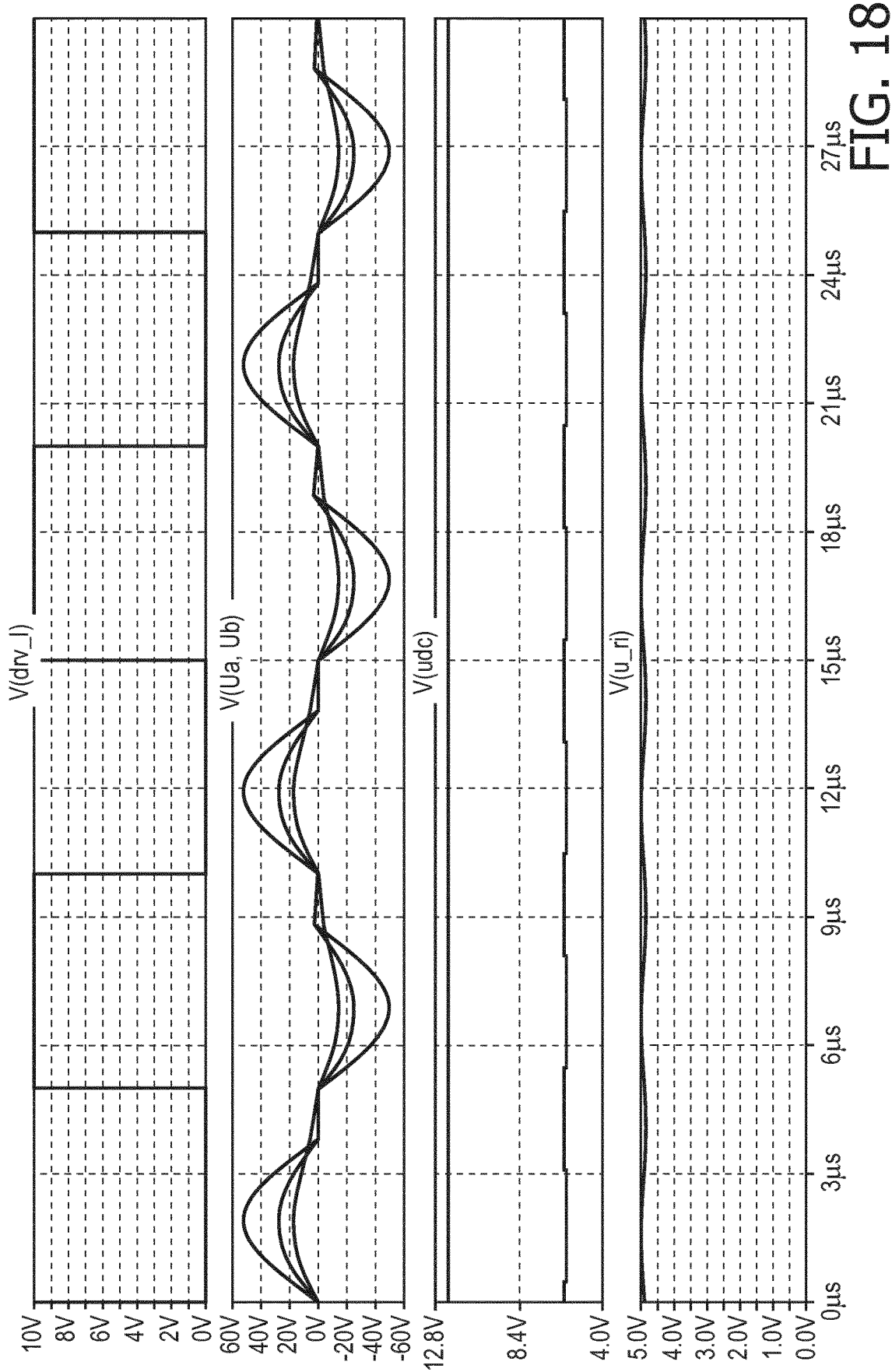

However, using the previously described approach the natural resonance frequency of the parallel resonance circuit 601 may instead be shifted upwards, e.g. by reducing the value of capacitor C1. For L1=12 u, L2*a*=L2*b*=33 u, Fres=110 kHz, Fop=100 kHz and K=0, the value for C1 becomes 150n. Using the same drive signals, the signals of FIG. 18 may instead be experienced.

In this example, each zero crossing is associated with a fractional time interval in which the voltage over the parallel resonance circuit is frozen at substantially zero as previously described. This is achieved by the combination of the body diodes of the FETs and the drive signals with the former initiating the fractional time intervals upon zero crossings and the latter terminating the fractional time intervals at appropriate times to get the desired effective resonance frequency.

As can be seen the voltage V(Ua,Ub) no longer shows steep edges or step changes but has "freeze" intervals near the zero crossings. This approach again allows the system to use zero voltage switching. Although the voltage waveform is not a sine wave, it is still a friendly waveform from an EMI perspective.

Further, as can be seen the effective resonance frequency of the transmitter is effectively and automatically tuned to match the drive/operating frequency. The duration of the fractional time intervals is automatically adapted to match the difference between the duration of a natural resonance cycle and the desired effective resonance cycle duration. The fractional time intervals indeed are automatically adapted to compensate for changes in the loading or coupling that may cause changes to the natural resonance frequency of the parallel resonance circuit.

Figure 19:
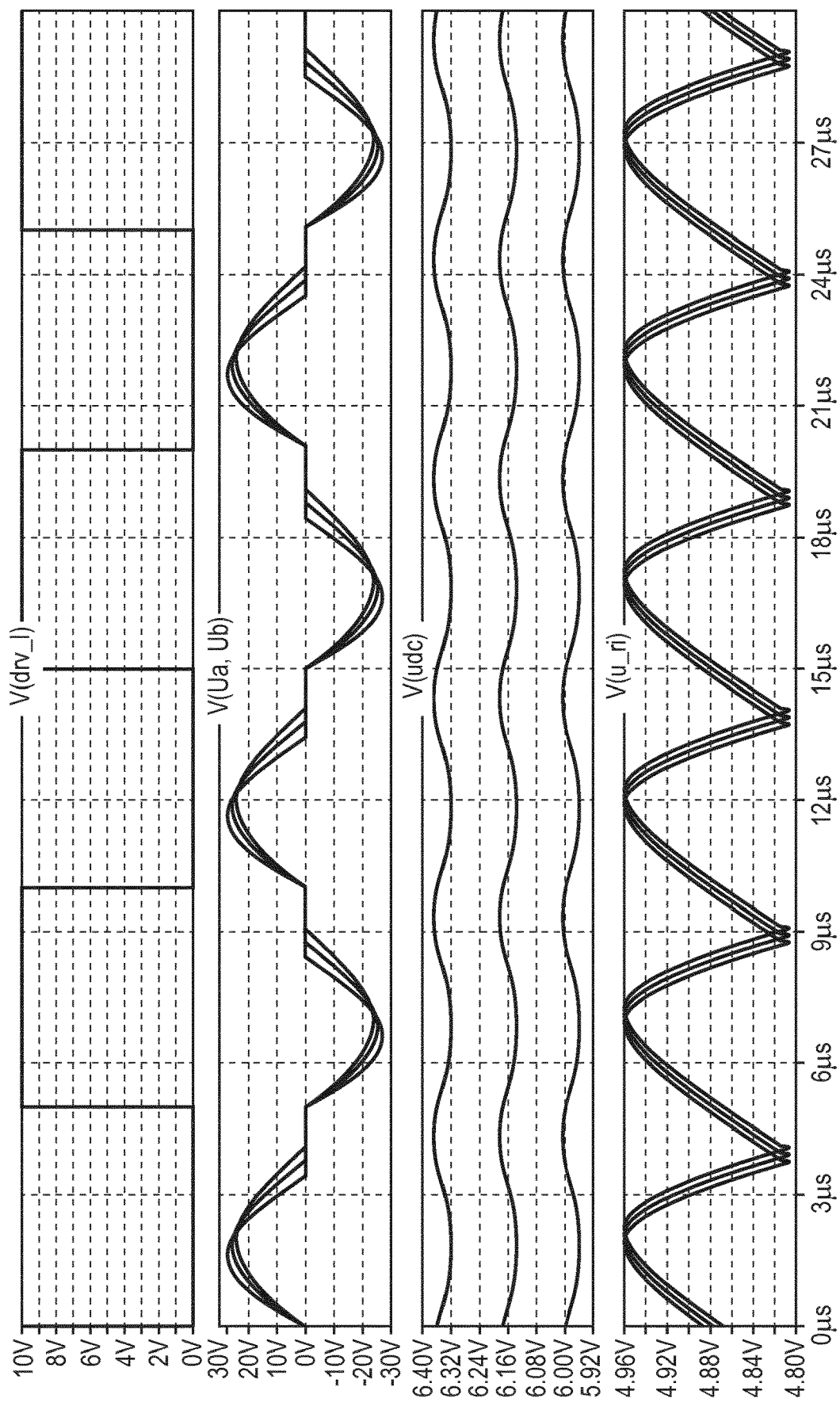

Also, with the introduction of the fractional time intervals, more tolerance can be allowed for the components in the resonant system. This is shown in FIG. 19. For L1=12 u, L2a=L2b=33 u, Fop=100 kHz and K=0.25, the value for C1 equals 125n, 150n and 175n respectively.

As described, the duty cycle of the drive signals may in many embodiments be independent of the duration of the fractional time intervals. Indeed, as described, the drive signals may be used to set the end time of the fractional time intervals whereas the start times may be set by the rectifiers switching on. In such embodiments, the drive signals may accordingly be set to have a constant frequency corresponding to the desired operating frequency. Further, as the rectifier will automatically adapt the switch elements 607, 609 to switch to the closed position (by conducting at a zero crossing) the fractional time intervals are not dependent on when the drive signal switches the switch elements 607, 609 on. Thus, there is no need to adapt the duty cycle but rather a low complexity and easy to implement use of a fixed duty cycle, such as e.g. 55% can be employed.

However, in some embodiments, the driver 611 may be arranged to vary a duty cycle in response to the duration of the fractional time intervals. This may for example be done in systems as previously described wherein the driver 611 detects zero crossings or peak inductor currents and actively controls the drive signals to close both switch elements 607, 609 at such times.

However, the adaptation of the duty cycle may also be performed in approaches that use a rectifier. For example, for the circuit of FIG. 12, the rectifier 1201 may begin to conduct upon a zero crossing of the voltage on the cathode of the rectifier. It will then remain in the conductive mode until switch S1 is switched on by the drive signal. If this does not happen until roughly the time that switch S2 is switched to the open state, the rectifier will conduct current for the whole fractional time interval. However, as rectifiers are typically associated with a voltage drop, this will result in a power loss in the rectifier for the entire duration of the fractional time interval.

Accordingly, in some embodiments, the driver 611 may be arranged to change the duty cycle such that the switch S1 is switched on before the end of the fractional time interval, i.e. before switch S2 is switched off. This may result in at least part of the fractional time interval being supported by the switch S1 being closed rather than by the rectifier 1201 conducting. As the power loss in the switch is typically much lower, this may provide reduced overall power loss.

For example, the driver 611 may sense current flowing through the rectifier 1201 and thus when this switches on, it may then proceed to switch the switch S1 on with a small delay. This will adapt the duty cycle of the drive signal to reduce the power loss.

It will be appreciated that whereas this description is provided with reference to the rectifier/switch arrangement of FIG. 12, it also applies directly to the implementation using a FET and body diode arrangement. Indeed, the power loss resulting from a switched-on drain/source channel is far lower than that resulting from the same current flowing through the body diode, and the arrangement thus corresponds directly to that described with reference to FIG. 12. Therefore, adapting the duty cycle may substantially reduce power loss in the FETs, and thus reduce e.g. the heating of these. This may be a substantial advantage in many embodiments as it may reduce the requirement for e.g. heatsinks.

Figure 20:
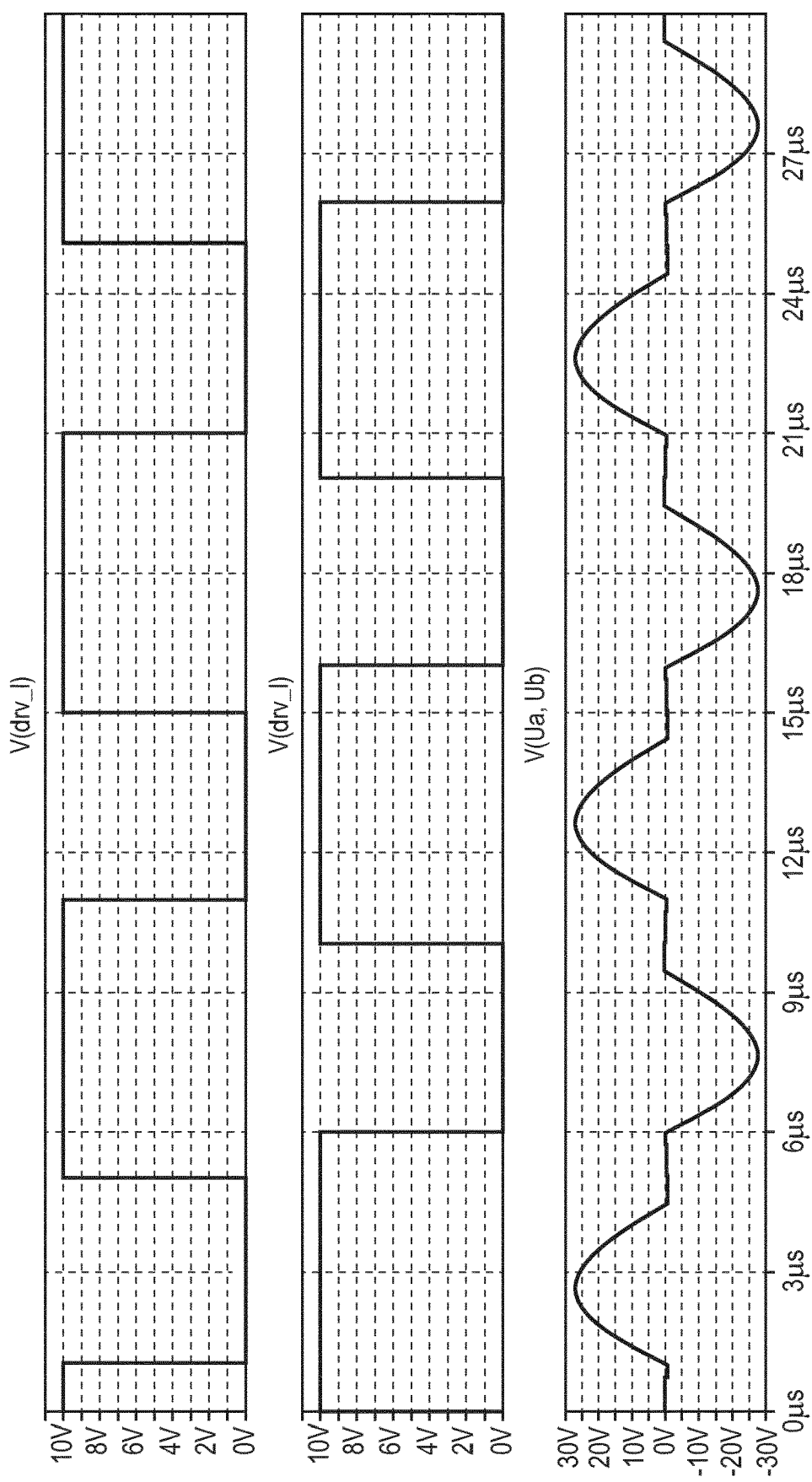

FIG. 20 illustrates an example of signals in such an embodiment. In the example, the drive signals for the gates of the FETs have a 60% duty cycle. In this example, the individual fractional time interval is still initiated by the body diode of the FET conducting. However, at some point during the fractional time interval, the drive signal for the corresponding gate goes on thereby switching the FET on. Thus, for the initial part of the fractional time interval, a first FET is switched on by its corresponding drive signal being high whereas the other FET is conducting by way of its body diode. At some point during the fractional time interval, the drive signal of the second FET goes high thereby switching the drain source channel on. Thus, in this second part of the fractional time interval both FETs are actively driven on, resulting in a reduced power dissipation and thus reduced losses. The fractional time interval then terminates by the drive signal of the first switch going low thereby switching the first FET off.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A wireless power transmitter; the wireless power transmitter comprising:
   a parallel resonance circuit comprising at least a capacitive impedance and an inductive impedance, the inductive impedance comprising a transmitter coil;
   a power source having a current sink terminal and at least one power source terminal configured to provide current to the parallel resonance circuit, wherein the power source is configured to limit a rate of change of a current drawn from the power source terminal;
   a first switch having a first terminal and a second terminal, wherein the first terminal is coupled to a first end of the parallel resonance circuit, and wherein the second terminal is coupled to the current sink terminal;
   a second switch having a third terminal and a fourth terminal, wherein the third terminal is coupled to a second end of the parallel resonance circuit, and wherein the fourth terminal is coupled to the current sink terminal; and
   a driver circuit configured to generate at least one cyclic drive signal for the first switch and the second switch, wherein
   the driver circuit is configured to generate the at least one cyclic drive signal such that each cycle comprises a first time interval in which the first switch is closed and the second switch is open, a second time interval in which the first switch is open and the second switch is closed, and a third time interval in which both the first switch and the second switch are closed, wherein the third time interval is between the first time interval and the second time interval.

2. The wireless power transmitter of claim 1, wherein the transmitter coil has a center tap and the at least one power source terminal is coupled to the center tap.

3. The wireless power transmitter of claim 1, wherein the power source comprises a first power source terminal coupled to the first end of the parallel resonance circuit and a second power source terminal coupled to the second end of the parallel resonance circuit, and
   wherein the power source is configured to individually limit the current drawn from the first and second power source terminals.

4. The wireless power transmitter of claim 3, wherein the power source comprises a first inductor and a second inductor,
   wherein the first inductor is coupled to the first power source terminal, and
   wherein the second inductor is coupled to the second power source terminal.

5. The wireless power transmitter of claim 1, wherein a cycle duration for a cycle of the at least one cyclic drive signals exceeds a resonance period time for a resonance frequency corresponding to the capacitive impedance and inductive impedance by no less than 5%.

6. The wireless power transmitter of claim 1, wherein the driver circuit is configured to vary a duration of the third time interval in response to a variation of a loading of a power transfer signal.

7. The wireless power transmitter of claim 1, wherein the driver circuit is configured to vary a duration of the third time interval in response to a variation of a coupling between the wireless power transmitter and a power receiver.

8. The wireless power transmitter of claim 1, wherein the driver circuit is configured to synchronize at least one of an end time and a start time of the third time interval to a property of a signal of the parallel resonance circuit.

9. The wireless power transmitter of claim 1 wherein the driver circuit is configured to initiate the third time interval in response to a zero crossing of a voltage over the second switch.

10. The wireless power transmitter of claim 9, wherein the driver circuit is configured to terminate the third time interval by the at least one cyclic drive signal switching to a state corresponding to the first switch being open.

11. The wireless power transmitter of claim 9, wherein the second switch comprises a rectifier entering a conducting state following the zero crossing.

12. The wireless power transmitter of claim 11,
    wherein the second switch comprises a Field Effect Transistor coupled between the third terminal and the fourth terminal,
    wherein the second switch is configured to switch in response to the at least one cyclic drive signal, and
    wherein the rectifier is formed by a body diode of the Field Effect Transistor.

13. The wireless power transmitter of claim 9, wherein a duty cycle of the drive signal is independent of a duration of the third time interval.

14. The wireless power transmitter of claim 1 wherein the driver circuit is configured to vary a duty cycle of the drive signal in response to a duration of the third time interval.

15. A method of transmitting power from a wireless power transmitter to a wireless power receiver via a wireless power transfer signal, wherein the wireless power transmitter includes a parallel resonance circuit coupled to a power source having a current sink terminal and a power source terminal, the method comprising:
   driving, during a first time interval, a first switch and a second switch of the wireless power transmitter such that the first switch is closed and the second switch is open, wherein the first switch includes a first terminal coupled to a first end of the parallel resonance circuit and a second terminal coupled to the current sink terminal, and wherein the second switch includes a third terminal coupled to a second end of the parallel resonance circuit and a fourth terminal coupled to the current sink terminal;

driving, during a second time interval, the first switch and the second switch of the wireless power transmitter such that the first switch is open and the second switch is closed;

driving, during a third time interval, the first switch and the second switch of the wireless power transmitter such that the first switch is closed and the second switch is closed, wherein the third time interval is between the first time interval and the second time interval; and cyclically driving the first switch and the second switch of the wireless power transmitter during the first time interval, the second time interval, and the third time interval.

16. The method of claim 15, further comprising varying a duration of the third time interval in response to a variation of a loading of the power transfer signal.

17. The method of claim 15, further comprising varying a duration of the third time interval in response to a variation of a coupling between the power transmitter and the power receiver.

18. The method of claim 15, further comprising synchronizing at least one of an end time and a start time of the third time interval to a property of a signal of the parallel resonance circuit.

19. The method of claim 15, further comprising initiating the third time interval in response to a zero crossing of a voltage over the second switch.

* * * * *